United States Patent
Takeda et al.

(10) Patent No.: US 10,367,214 B2
(45) Date of Patent: Jul. 30, 2019

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventors: Hiroshi Takeda, Kanagawa (JP); Masashi Sato, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/766,536

(22) PCT Filed: Oct. 8, 2015

(86) PCT No.: PCT/JP2015/078663
§ 371 (c)(1),
(2) Date: Apr. 6, 2018

(87) PCT Pub. No.: WO2017/061015
PCT Pub. Date: Apr. 13, 2017

(65) Prior Publication Data
US 2018/0294496 A1    Oct. 11, 2018

(51) Int. Cl.
*H01M 8/04* (2016.01)
*H01M 8/04746* (2016.01)
(Continued)

(52) U.S. Cl.
CPC ......... *H01M 8/04776* (2013.01); *H01M 4/86* (2013.01); *H01M 8/04* (2013.01);
(Continued)

(58) Field of Classification Search
CPC ...... H01M 8/04776; H01M 4/86; H01M 8/24; H01M 8/04425; H01M 8/04373;
(Continued)

(56) References Cited

U.S. PATENT DOCUMENTS

2010/0221624 A1    9/2010  Makino et al.
2015/0056533 A1*   2/2015  Obata ............... H01M 8/04089
                                                          429/446

FOREIGN PATENT DOCUMENTS

CN    104170141 A    11/2014
JP    2998549 B2     1/2000
(Continued)

*Primary Examiner* — Cynthia K Walls
(74) *Attorney, Agent, or Firm* — Foley & Lardner LLP

(57) ABSTRACT

A fuel cell system that supplies an anode gas and a cathode gas to a fuel cell to cause the fuel cell to generate an electricity. The fuel cell system includes a high pressure tank, an anode gas supply passage configured to supply the anode gas to the fuel cell from the high pressure tank, an anode pressure control valve disposed on the anode gas supply passage, the anode pressure control valve adjusting an anode gas pressure of the fuel cell, an anode gas valve disposed between the high pressure tank and the anode pressure control valve, the anode gas valve adjusting a source pressure of the anode pressure control valve, and a valve control unit configured to control to open and close the anode pressure control valve and the anode gas valve on the basis of an operating state of the fuel cell system. The valve control unit controls the anode pressure control valve and then closes the anode pressure control valve after the valve control unit closes the anode gas valve such that a first pipe pressure becomes less than a predetermined pressure before the fuel cell system is stopped, the first pipe pressure being a pressure inside a first pipe between the anode gas valve and the anode pressure control valve in the anode gas supply passage. The valve control unit opens the anode pressure control valve at an activation of the fuel cell system. The predetermined pressure is smaller than a pressure that degrades a durability of the fuel cell at the activation of the fuel cell system.

8 Claims, 18 Drawing Sheets

(51) Int. Cl.
*H01M 8/04082* (2016.01)
*H01M 8/04302* (2016.01)
*H01M 8/04303* (2016.01)
*H01M 4/86* (2006.01)
*H01M 8/0432* (2016.01)
*H01M 8/0438* (2016.01)
*H01M 8/24* (2016.01)

(52) U.S. Cl.
CPC ... *H01M 8/04201* (2013.01); *H01M 8/04302* (2016.02); *H01M 8/04303* (2016.02); *H01M 8/04373* (2013.01); *H01M 8/04425* (2013.01); *H01M 8/04753* (2013.01); *H01M 8/24* (2013.01); *H01M 2004/8684* (2013.01); *H01M 2004/8689* (2013.01)

(58) Field of Classification Search
CPC ......... H01M 8/04303; H01M 8/04753; H01M 8/04201; H01M 8/04302; H01M 8/04; H01M 2004/8689; H01M 2004/8684
See application file for complete search history.

(56) References Cited

FOREIGN PATENT DOCUMENTS

| JP | 2003-86214 A | 3/2003 |
| JP | 2007-157449 A | 6/2007 |
| JP | 2008-273338 A | 11/2008 |
| JP | 2013-113366 A | 6/2013 |

* cited by examiner

FUEL CELL SYSTEM AND CONTROL METHOD FOR FUEL CELL SYSTEM

TECHNICAL FIELD

The present invention relates to a fuel cell system configured to warm up an anode pressure control valve at an activation and a control method for the fuel cell system.

BACKGROUND ART

There are proposed an anode gas non-circulation type fuel cell system and an anode gas circulation type fuel cell system for a fuel cell system. The anode gas non-circulation type fuel cell system does not circulate an anode gas, which is a fuel gas, and discharges an anode off-gas after a reaction together with a cathode off-gas. The anode gas circulation type fuel cell system circulates the anode gas, and additionally supplies the anode gas from a high pressure tank as necessary.

In order to supply the anode gas to a fuel cell (a fuel cell stack), a high pressure anode gas stored in the high pressure tank is depressurized to a medium pressure via a medium pressure control valve, and corresponding to a load request and an operating state of the fuel cell, the medium pressure anode gas is supplied to the fuel cell at a predetermined duty ratio by an anode pressure control valve disposed in a downstream of the medium pressure control valve.

The anode pressure control valve usually uses a normally closed solenoid valve, which is an ON/OFF type valve internally including a solenoid coil. A duty ratio of the anode pressure control valve is operated by a controller that controls the entire fuel cell. A drive signal to the solenoid coil is supplied via a DC/DC converter for a high-voltage battery or a fuel cell. Therefore, while the fuel cell system is operating, a voltage of this drive signal is stable.

With such a solenoid valve, an operating state is susceptible to a temperature change in a usage environment. That is, the temperature change in the usage environment changes, for example, an electrical resistance of the solenoid coil of the solenoid valve and a sliding resistance of a plunger as a movable iron core.

In view of this, even though the drive signal with an identical duty ratio is output to the solenoid valve, a valve opening degree of the anode pressure control valve is possibly different depending on the usage environment. In particular, at a first activation of the fuel cell system, such an influence becomes remarkable since the drive signal is not supplied to the solenoid valve for a while.

When a usage environment temperature is below zero, the fuel cell system is activated below zero. Then, there has been a problem that, at a first driving of the anode pressure control valve, a reaction of the plunger cannot follow the duty ratio to cause an anode gas pressure inside the fuel cell to overshoot.

In order to solve such a problem, for example, JP2998549B discloses a control device for a current control type solenoid valve that directly or indirectly measures an electrical resistance of a solenoid coil of a solenoid valve to change a feedback gain of a controller on the basis of the result.

JP2008-273338A discloses a braking control device that estimates an ambient temperature of the braking control device to estimate a temperature of a solenoid coil (a coil temperature) of a solenoid valve on the basis of a temperature transmission characteristic of the solenoid valve with respect to the estimated ambient temperature to correct an output duty ratio of the solenoid valve in accordance with the estimated coil temperature.

SUMMARY OF INVENTION

However, in the control device for the current control type solenoid valve disclosed in JP2998549B, a resistance measuring device, a current sensor, and a voltage sensor are necessary when the electrical resistance of the solenoid coil is directly measured. When the electrical resistance is estimated, for example, a temperature sensor is necessary. Due to the necessity of such auxiliary machines, there is a problem of a complicated system and an increased production cost of the system.

In the braking control device disclosed in JP2008-273338A, it is necessary to apply a current to the solenoid coil of the solenoid valve first in order to estimate the ambient temperature and the coil temperature. This possibly causes a failure at, for example, an activation of the system.

In this braking control device, a measure to deal with a case where the ambient temperature and the coil temperature cannot be estimated is necessary. Then, in this braking control device, an allowable current value at a minimum temperature is supplied in order to prevent an overcurrent from being applied to the solenoid coil even when the coil temperature cannot be estimated.

When the actual coil temperature is high in such a case, that is, when the coil temperature cannot be estimated, it is possible that an anode gas boost speed inside the fuel cell slows down because the current supplied to the solenoid coil is corrected to a safety side. The slowed down anode gas boost speed possibly causes damages to, for example, an electrolyte membrane inside the fuel cell depending on the operating state of the fuel cell.

The present invention has been made focusing on the above-described problems and it is one of the objectives of the present invention to provide a fuel cell system configured to satisfy a request of an anode gas boost speed inside the fuel cell and reduce an overshooting of the anode gas in whatever activation condition and a control method for the fuel cell system.

According to an aspect of this invention, there is provided a fuel cell system that supplies an anode gas and a cathode gas to a fuel cell to cause the fuel cell to generate an electricity. The fuel cell system includes a high pressure tank that stores the anode gas in a high pressure, the anode gas being supplied to the fuel cell, an anode gas supply passage configured to supply the anode gas to the fuel cell from the high pressure tank, an anode pressure control valve disposed on the anode gas supply passage, the anode pressure control valve adjusting an anode gas pressure of the fuel cell, an anode gas valve disposed between the high pressure tank and the anode pressure control valve, the anode gas valve adjusting a source pressure of the anode pressure control valve, and a valve control unit configured to control to open and close the anode pressure control valve and the anode gas valve on the basis of an operating state of the fuel cell system. The valve control unit controls the anode pressure control valve and then closes the anode pressure control valve after the valve control unit closes the anode gas valve such that a first pipe pressure becomes less than a predetermined pressure before the fuel cell system is stopped, the first pipe pressure being a pressure inside a first pipe between the anode gas valve and the anode pressure control valve in the anode gas supply passage. On the other hand, the valve control unit opens the anode pressure control valve at an activation of the fuel cell system. In this case, the predetermined pressure is smaller than a pressure that degrades a durability of the fuel cell at the activation of the fuel cell system.

DESCRIPTION OF EMBODIMENTS

The following describes embodiments of the present invention with reference to attached drawings.

First Embodiment

Figure 1:
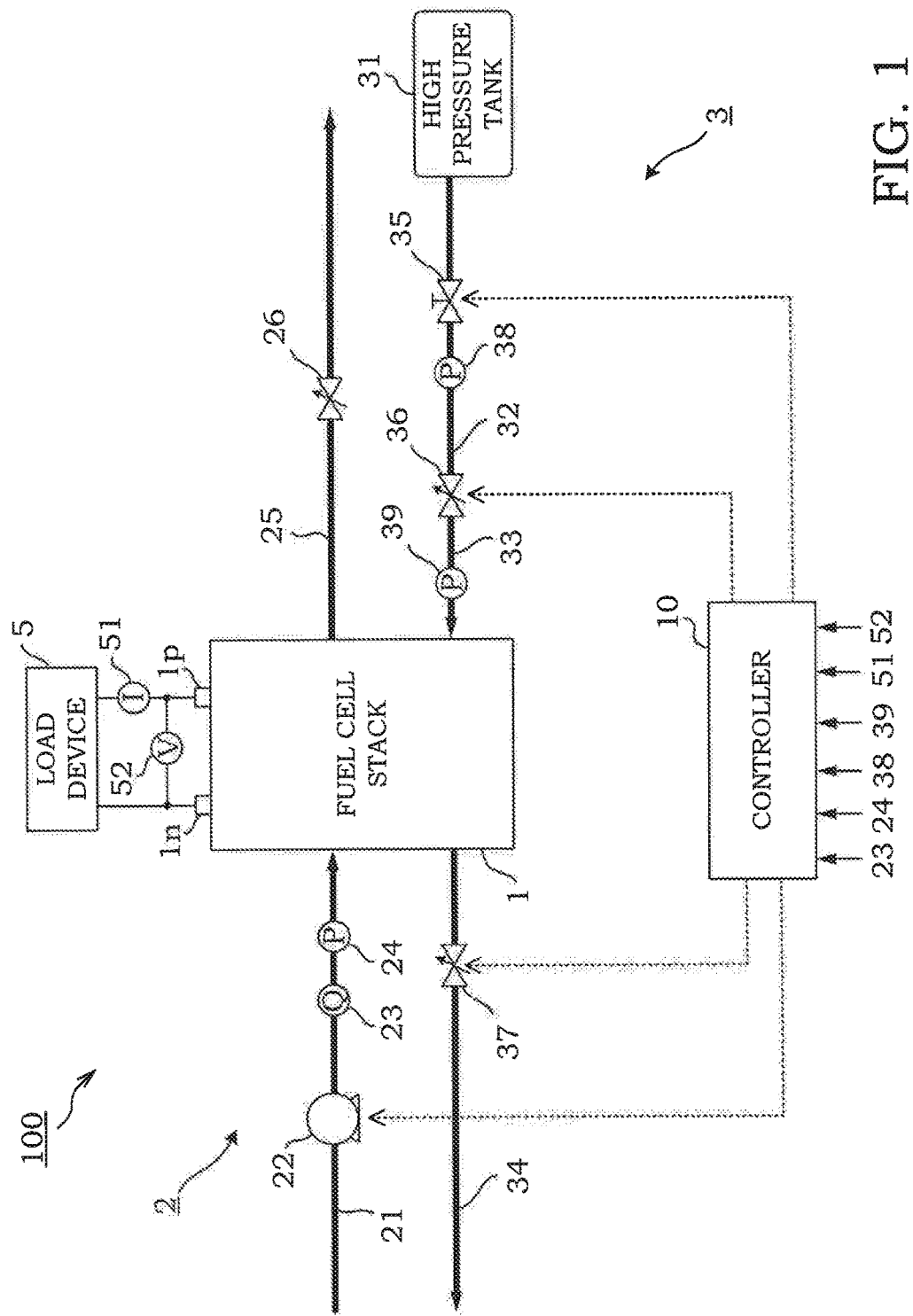
FIG. 1 is a drawing illustrating an overall configuration of a fuel cell system in a first embodiment of the present invention.

FIG. 1 is a drawing illustrating an overall configuration of a fuel cell system 100 according to a first embodiment of the present invention. The fuel cell system 100 in the embodiment is a fuel cell system of an anode gas non-circulation type. This fuel cell system 100 constitutes a power supply system that supplies an anode gas (a fuel gas) and a cathode gas (an oxidant gas) necessary for an electric generation to a fuel cell stack 1 from an outside to cause an electrode reaction with an anode electrode and a cathode electrode (not illustrated) to cause the fuel cell stack 1 to generate an electricity in accordance with an operating state of a load device 5 electrically coupled. This fuel cell system 100 is mounted, for example, in an electric vehicle in which a drive motor drives the vehicle. It should be noted that this fuel cell system 100 is also applicable to a load of, for example, a device other than a fuel cell vehicle (the electric vehicle using the fuel cell) as long as a driving source is the fuel cell.

As illustrated in FIG. 1, the fuel cell system 100 mainly includes the fuel cell stack 1, a cathode gas supplying/discharging device 2, an anode gas supplying/discharging device 3, the load device 5, and a controller 10.

The fuel cell stack 1 is a stacked cell in which a plurality of fuel cells (not illustrated) are stacked. The fuel cell stack 1 is coupled to the load device 5 to supply an electric power generated by the electrode reaction to the load device 5. The fuel cell stack 1 generates a DC voltage of, for example, several hundred V (volts).

While the illustration is omitted, the fuel cell stack 1 is constituted by having an electrolyte membrane interposed between the anode electrode (a fuel electrode) and the cathode electrode (an oxidant electrode). When the fuel cell stack 1 is operating, hydrogen is ionized in the anode electrode and hydrogen ions and electrons are generated. In the cathode electrode, the hydrogen ions and electrons generated in the anode electrode react with oxygen, and water is generated.

The cathode gas supplying/discharging device 2 is a device that supplies the cathode gas to the fuel cell stack 1 and discharges a cathode off-gas discharged from the fuel cell stack 1 into an atmosphere. It should be noted that the cathode off-gas includes oxygen and nitrogen that did not react in the cathode electrode, generated water vapor, and the like.

The cathode gas supplying/discharging device 2 includes a cathode gas supply passage 21, a compressor 22, a flow rate sensor 23, a pressure sensor 24, a cathode gas discharge passage 25, and a cathode pressure control valve 26.

The cathode gas supply passage 21 is a passage to supply the cathode gas to the fuel cell stack 1. The cathode gas supply passage 21 has one end that opens and the other end that is coupled to a cathode gas inlet hole of the fuel cell stack 1.

The compressor 22 is disposed on the cathode gas supply passage 21. The compressor 22 retrieves an air containing oxygen from the opening end of the cathode gas supply passage 21 to supply the air to the fuel cell stack 1 as the cathode gas. A rotation speed of the compressor 22 is controlled by the controller 10.

The flow rate sensor 23 is disposed between the compressor 22 and the fuel cell stack 1 on the cathode gas supply passage 21. The flow rate sensor 23 detects a flow rate of the cathode gas supplied to the fuel cell stack 1. Flow rate data of the cathode gas detected by the flow rate sensor 23 is output to the controller 10.

The pressure sensor 24 is disposed between the compressor 22 and the fuel cell stack 1 on the cathode gas supply passage 21, similarly to the flow rate sensor 23. The pressure sensor 24 detects the pressure of the cathode gas supplied to the fuel cell stack 1. Pressure data of the cathode gas detected by the pressure sensor 24 is output to the controller 10.

The cathode gas discharge passage 25 is a passage to discharge the cathode off-gas from the fuel cell stack 1. The cathode gas discharge passage 25 has one end that is coupled to a cathode gas outlet hole of the fuel cell stack 1 and the other end that opens.

The cathode pressure control valve 26 is disposed on the cathode gas discharge passage 25. For the cathode pressure control valve 26, for example, a solenoid valve with which an opening degree of the valve is changeable in phases is used. The cathode pressure control valve 26 is controlled to open and close by the controller 10. This open/close control adjusts the cathode gas pressure to a desired pressure.

The anode gas supplying/discharging device 3 is a device that supplies the anode gas to the fuel cell stack 1 and discharges an anode off-gas discharged from the fuel cell stack 1 into the atmosphere. It should be noted that, while the illustration is omitted, the anode off-gas discharged from the fuel cell stack 1 is mixed with the cathode off-gas inside the cathode gas discharge passage 25 and discharged outside the fuel cell system 100. Since the anode off-gas contains excess hydrogen that was not used in the electrode reaction, the anode off-gas is discharged outside the fuel cell system 100 by being mixed with the cathode off-gas so as to cause a hydrogen concentration in the discharged gas to become equal to or less than a predetermined concentration determined in advance.

The anode gas supplying/discharging device 3 includes a high pressure tank 31, a first pipe 32 and a second pipe 33 on an anode gas supply passage, an anode gas discharge passage 34, an anode gas valve 35, an anode pressure control valve 36, a purge valve 37, a first pipe pressure sensor 38, and a second pipe pressure sensor 39.

The high pressure tank 31 is a hydrogen tank that keeps and stores the anode gas (a hydrogen gas), which is supplied to the fuel cell stack 1, in a highly pressured state.

The first pipe 32 of the anode gas supply passage is a passage to supply the anode gas stored in the high pressure tank 31 to the fuel cell stack 1 and a pipe between the anode gas valve 35 and the anode pressure control valve 36. The second pipe 33 of the anode gas supply passage is a pipe between the anode pressure control valve 36 and an anode gas inlet hole.

The anode gas supply passage has one end coupled to the high pressure tank 31 and the other end coupled to the anode gas inlet hole of the fuel cell stack 1 via the anode pressure control valve 36 and the anode gas valve 35.

The anode gas discharge passage 34 is a passage through which the anode off-gas discharged from the fuel cell stack 1 flows. The anode gas discharge passage 34 has one end coupled to an anode gas outlet hole of the fuel cell stack 1 and the other end coupled to the cathode gas discharge passage 25 as described above.

The anode gas valve 35 is disposed on the anode gas supply passage in the downstream of the high pressure tank 31. The anode gas valve 35 is a solenoid valve or a mechanical valve to supply the high pressure anode gas stored in the high pressure tank 31 into the first pipe.

It should be noted that while the embodiment provides a case where only one anode gas valve 35 is disposed on the anode gas supply passage for the convenience of illustration, the present invention is not limited to such a configuration. For example, the anode gas valve 35 may be constituted of a plurality of valves, such as a main stop valve that turns ON/OFF the supply of the high pressure anode gas in the high pressure tank 31 and a medium pressure valve and a medium pressure cutoff valve that maintain the anode gas supplied to the fuel cell stack 1 in the medium pressure.

The anode gas valve 35 may be a mechanical valve or may be a solenoid valve as described above. In the case of the solenoid valve, the anode gas valve 35 is controlled to open and close (ON/OFF) by the controller 10 as illustrated in FIG. 1.

The anode pressure control valve 36 is disposed between the anode gas valve 35 and the anode gas inlet hole of the fuel cell stack 1 on the anode gas supply passage. For the anode pressure control valve 36, for example, a solenoid valve with which an opening degree of the valve is changeable in phases is used. The anode pressure control valve 36 is controlled to open and close by the controller 10. This open/close control adjusts the anode gas pressure supplied to the fuel cell stack 1, that is, the pressure inside the second pipe.

The purge valve 37 is disposed on the anode gas discharge passage 34. The purge valve 37 is a solenoid valve to discharge the anode off-gas to the cathode gas discharge passage 25. An opening degree of the purge valve 37 is controlled by the controller 10.

The first pipe pressure sensor 38 is disposed on anode gas supply passage between the anode gas valve 35 and the anode pressure control valve 36, that is, on the first pipe. The first pipe pressure sensor 38 detects the pressure inside the first pipe. Pressure data of the anode gas detected by the first pipe pressure sensor 38, that is, first pipe pressure data is output to the controller 10.

The second pipe pressure sensor 39 is disposed on the anode gas supply passage between the anode pressure control valve 36 and the anode gas inlet hole of the fuel cell stack 1, that is, on the second pipe. The second pipe pressure sensor 39 detects the pressure of the anode gas supplied to the fuel cell stack 1. Pressure data of the anode gas detected by the second pipe pressure sensor 39, that is, second pipe pressure data is output to the controller 10.

The load device 5 is driven by receiving a generated power (a DC power) supplied from the fuel cell stack 1. The load device 5 is constituted of, for example, an electric motor that drives a vehicle, an inverter for electric motor that converts the DC power output from the fuel cell stack 1 into an AC power supplied to the electric motor, a part of an auxiliary machine that assists the electric generation of the fuel cell stack 1, and a control unit that controls the electric motor. The auxiliary machine of the fuel cell stack 1 includes, for example, the compressor 22.

Figure 2:
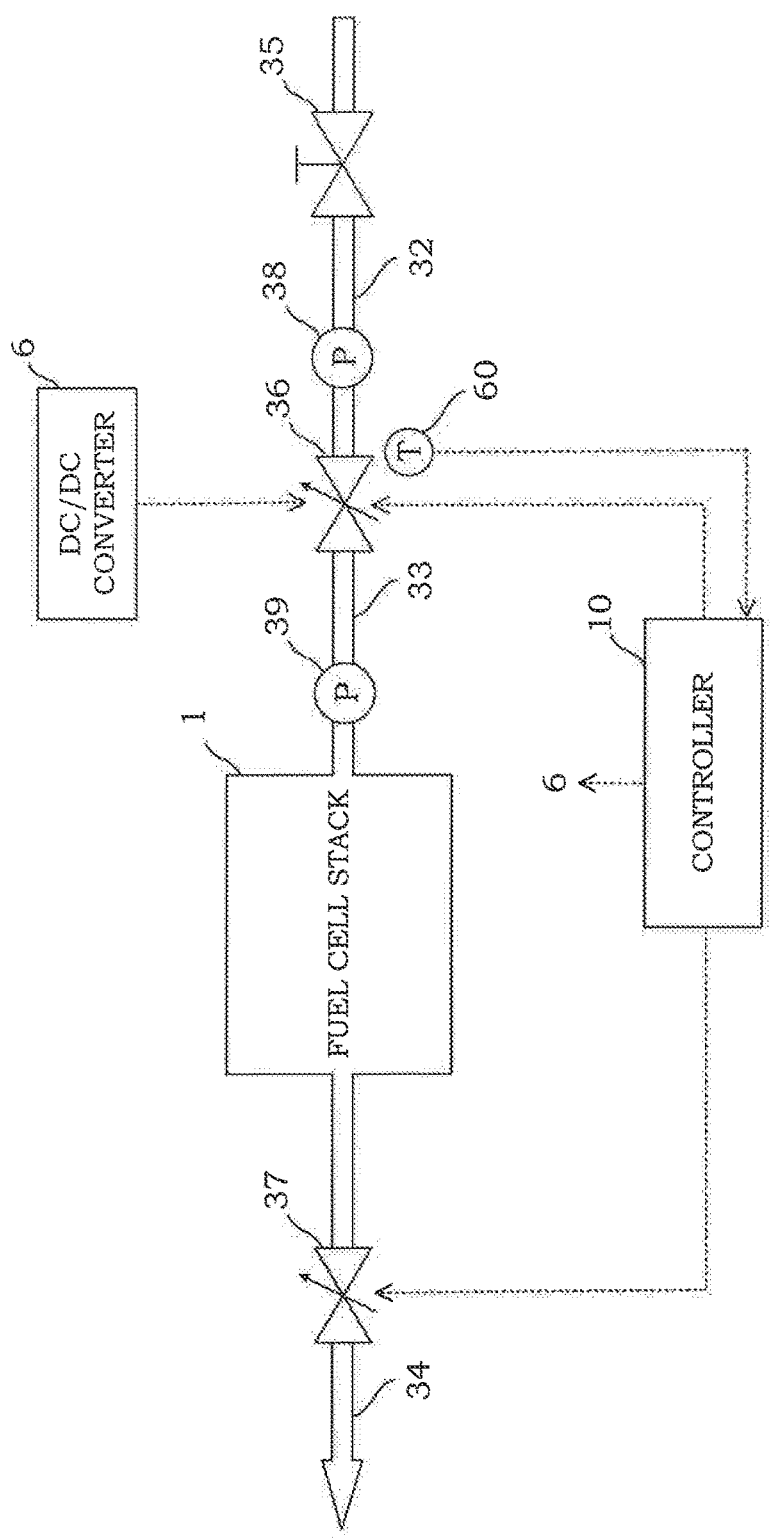
FIG. 2 is an enlarged view of an anode gas supplying/discharging device in FIG. 1.

As illustrated in FIG. 2, the load device 5 further includes a DC/DC converter 6 that boosts a pressure of the DC power output from the fuel cell stack 1 with a predetermined required voltage ratio. FIG. 2 is an enlarged view of the anode gas supplying/discharging device 3 in FIG. 1. This DC/DC converter 6 is arranged between the fuel cell stack 1 and the electric motor inverter. In the embodiment, while the illustration is omitted, a high pressure battery is disposed in parallel with the fuel cell stack 1 with respect to the DC/DC converter 6. A DC/DC converter for a high pressure battery may be disposed in an output side of this high pressure battery.

It should be noted that the control unit (not illustrated), which controls the load device 5, outputs a required electric power requested to the fuel cell stack 1 to the controller 10. For example, the larger a depression amount of an accelerator pedal disposed in the vehicle becomes, the larger the required electric power of the load device 5 becomes.

Between the load device 5 and the fuel cell stack 1, a current sensor 51 and a voltage sensor 52 are arranged as illustrated in FIG. 1.

The current sensor 51 is coupled to a power line between a positive electrode terminal 1p of the fuel cell stack 1 and the load device 5. The current sensor 51 detects the current output to the load device 5 from the fuel cell stack 1 as an output power of the fuel cell stack 1. Output current data of the fuel cell stack 1 detected by the current sensor 51 is output to the controller 10.

The voltage sensor 52 is coupled between the positive electrode terminal 1p and a positive electrode terminal 1n of the fuel cell stack 1. The voltage sensor 52 detects an inter-terminal voltage that is a voltage between the positive electrode terminal 1p and the positive electrode terminal 1n of the fuel cell stack 1. Output voltage data of the fuel cell stack 1 detected by the voltage sensor 52 is output to the controller 10.

It should be noted that, while the illustration is omitted, an impedance measurement device to detect a wet/dry state of the electrolyte membrane of the fuel cell stack 1 is further included. This impedance measurement device is a device to measure an internal impedance of the fuel cell stack 1 correlated with the wet/dry state of the electrolyte membrane.

Generally, the less an included water quantity of the electrolyte membrane becomes, that is, the dryer the electrolyte membrane becomes, the larger an electrical resistance component of the internal impedance becomes. On the other hand, the more the included water quantity of the electrolyte membrane becomes, that is, the wetter the electrolyte membrane becomes, the smaller the electrical resistance component of the internal impedance becomes. In view of this, as a parameter to indicate the wet/dry state of the electrolyte membrane, the internal impedance of the fuel cell stack 1 is used.

The impedance measurement device supplies an alternating current having a frequency suitable for detecting the internal resistance of the fuel cell stack 1 to the positive electrode terminal 1p. Then, the impedance measurement device detects an AC voltage generated between the positive electrode terminal 1p and the positive electrode terminal 1n by this alternating current of the frequency, and dividing an amplitude of the detected AC voltage by an amplitude of the alternating current supplied to the positive electrode terminal 1p calculates the internal impedance.

In the embodiment, the fuel cell stack 1 generates an electric power corresponding to the request of the load device 5, and corresponding to the electric generation state of the fuel cell stack 1, the internal impedance of the fuel cell stack 1, that is, a wetness degree of the electrolyte membrane is controlled.

The controller 10 is constituted of a microcomputer including, for example, a central processing unit (CPU), a read-only memory (ROM), a random access memory (RAM), and an input/output interface (an I/O interface).

Respective detected data from the flow rate sensor 23, the pressure sensor 24, the first pipe pressure sensor 38, the second pipe pressure sensor 39, the current sensor 51, and the voltage sensor 52 are input to the controller 10. These data are used as parameters related to an operating state of the fuel cell system 100.

The controller 10 controls the flow rate and the pressure of the cathode gas by controlling the compressor 22 and the cathode pressure control valve 26 in accordance with the operating state of the fuel cell system 100 and controls the flow rate and the pressure of the anode gas by controlling the anode gas valve 35, the anode pressure control valve 36, and the purge valve 37.

Figure 3:
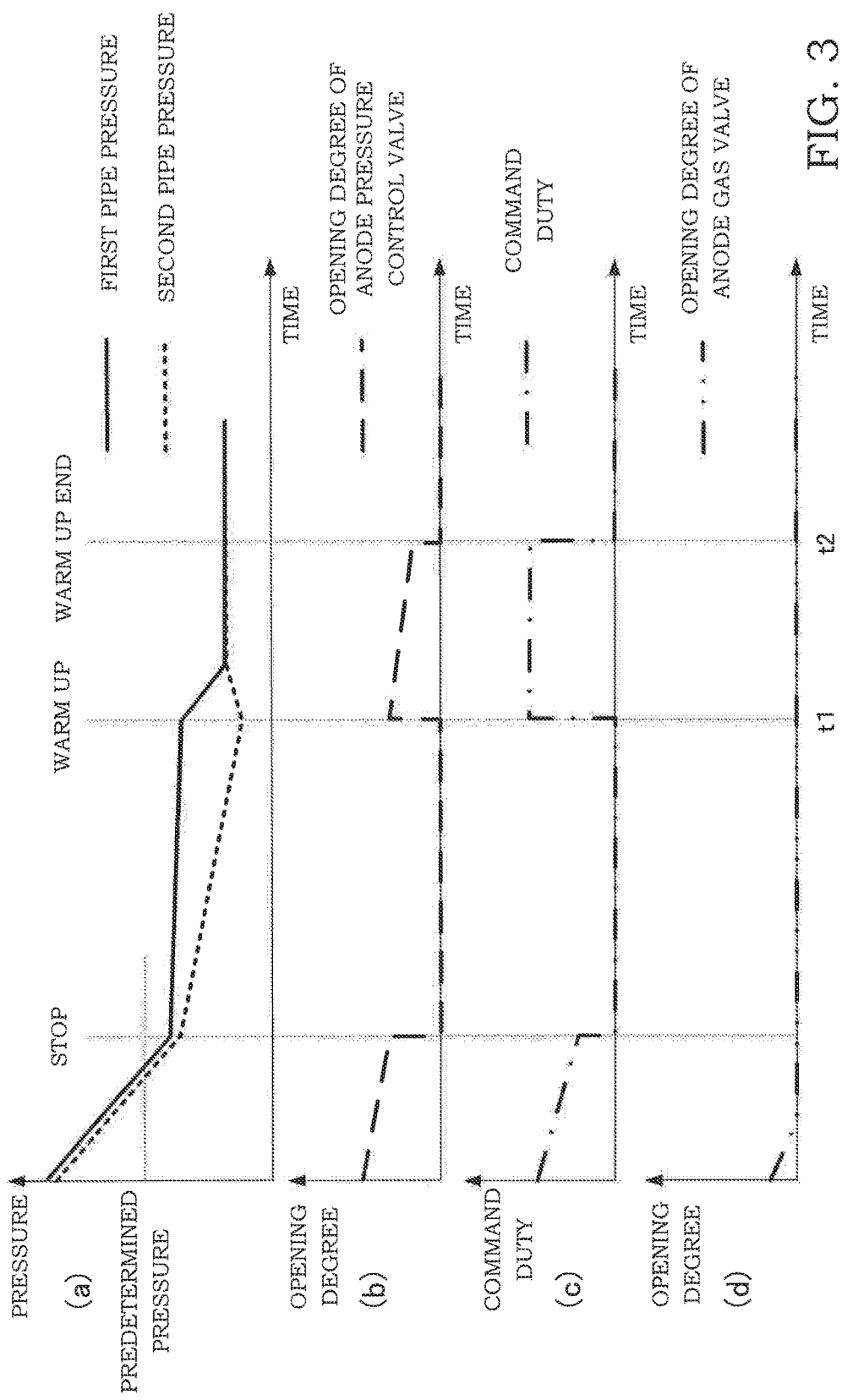
FIG. 3 is a timing chart illustrating a stopping and activating method for the fuel cell system of the embodiment.

Next, with reference to FIG. 2 and FIG. 3, an operation of the fuel cell system 100 according to the embodiment will be described. FIG. 3 is a timing chart illustrating a control method according to the embodiment. First, a configuration illustrated in FIG. 2 will be briefly described.

The DC/DC converter 6 is disposed in an output side of the fuel cell stack 1 in the embodiment and is a boost converter that boosts a pressure of the output voltage of the fuel cell stack 1 at a predetermined required voltage ratio. While the illustration is omitted, this DC/DC converter 6 includes a plurality of switching elements. In the embodiment, the switching elements perform switching actions by the control of the controller 10 and generate a PWM signal to perform the open/close control of the anode pressure control valve 36 and the purge valve 37. The generated PWM signal is output to the anode pressure control valve 36, and the anode pressure control valve 36 is controlled to open and close on the basis of a duty ratio of the PWM signal.

While it is not illustrated in FIG. 1, at proximity of the anode pressure control valve 36, a temperature sensor 60 to detect an ambient temperature of the anode pressure control valve 36 is disposed. Ambient temperature data of the anode pressure control valve 36 detected by the temperature sensor 60 is output to the controller 10.

In the embodiment, the fuel cell system 100 is configured to depressurize a first pipe pressure that is a pressure inside the first pipe 32 to less than a predetermined pressure as soon as a stop sequence of the fuel cell system 100 starts.

The "predetermined pressure" is a pressure smaller than a durability pressure that reduces a degradation of a durability of the fuel cell stack 1 at an activation of the fuel cell system 100. Stopping the fuel cell system 100 after depressurizing an inside of the first pipe 32 to such a predetermined pressure prevents a damage to each electrode and electrolyte membrane inside the fuel cell stack 1 even if the anode pressure control valve 36 opens with an opening degree greater than a command value at a next activation. It should be noted that the following describes (the maximum values of) the predetermined pressure and the durability pressure as $P_0$ and $P_{max}$, respectively, as necessary.

In the embodiment, at the activation of the fuel cell system 100, a current is firstly applied to the solenoid coil (not illustrated) of the anode pressure control valve 36 such that the anode pressure control valve 36 is opened to perform a warm up. This ensures the electrical resistance of the solenoid coil of the anode pressure control valve 36 and a sliding resistance of a plunger to be in a state not different from a normal operating state before the fuel cell stack 1 starts operating. Accordingly, in whatever activation condition, a request of an anode gas boost speed inside the fuel cell stack 1 can be satisfied and an overshooting of the anode gas pressure can be reduced.

Figure 4:
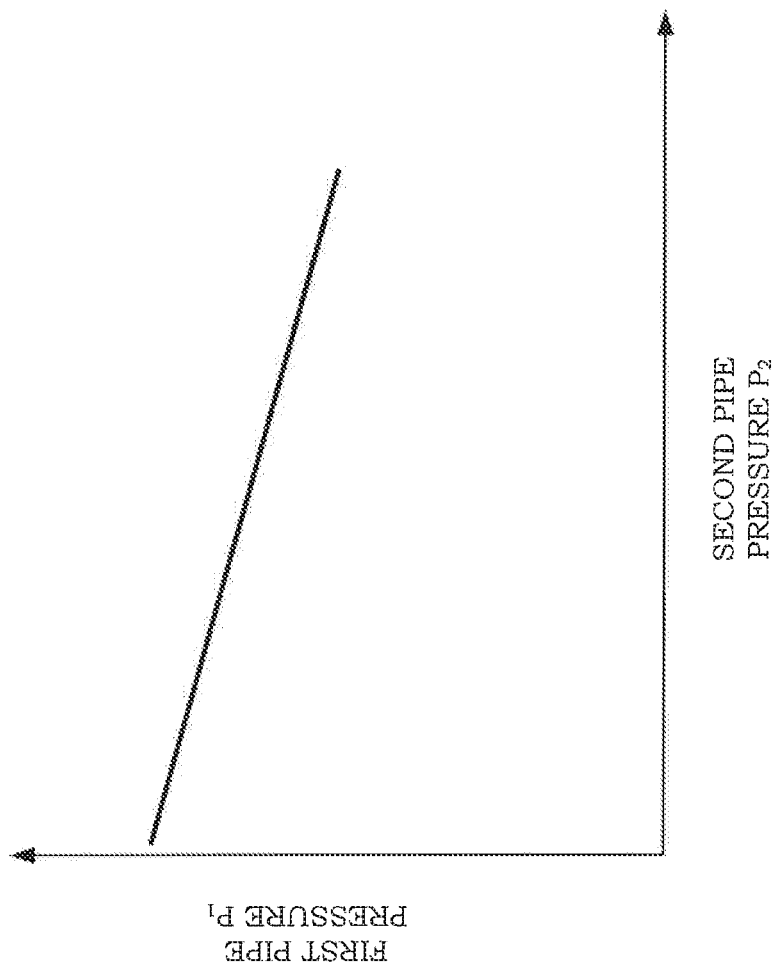
FIG. 4 is a graph illustrating a relation between a first pipe pressure and a second pipe pressure when the fuel cell system is stopped.

Here, with reference to FIG. 4, a relation between the first pipe pressure inside the first pipe 32 and a second pipe pressure inside the second pipe 33 when the fuel cell system 100 is stopped will be described. FIG. 4 is a graph illustrating the relation between the first pipe pressure and the second pipe pressure when the fuel cell system 100 is stopped. It should be noted that the second pipe pressure becomes equal to a pressure up to the purge valve 37 including the fuel cell stack 1; therefore, the description is made for the relation that entirely includes them.

A volume inside the first pipe is $V_1$, a volume of an entire anode system (hereinafter referred to as a "second pipe system") up to the purge valve 37 including the second pipe and the fuel cell stack 1 is $V_2$. The first pipe pressure and the second pipe pressure when the fuel cell system 100 is stopped are $P_1$ and $P_2$, respectively. An entire pressure after the anode pressure control valve 36 is opened is $P_3$. Then, assuming the anode gas that remains inside the first pipe and the anode off-gas that remains inside the second pipe system as an ideal gas establishes the following relational expression.

$$P_1 \times V_1 + P_2 \times V_2 = P_3 \times (V_1 + V_2) \quad (1)$$

In the embodiment, this $P_3$ is only necessary to be equal to or less than the maximum value $P_{max}$ of the durability pressure (a withstanding pressure in the downstream with respect to the anode pressure control valve 36) of the fuel cell stack 1, thus establishing the following relational expression.

$$P_{max} \times (V_1 + V_2) \geq P_1 \times V_1 + P_2 \times V_2 \quad (2)$$

Solving $P_1$ makes the following relational expression.

$$P_1 \leq \{P_{max} \times (V_1 + V_2) - P_2 \times V_2\}/V_1 \quad (3)$$

Here, $P_{max}$ becomes the withstanding pressure determined in a design phase of the fuel cell system 100 including the fuel cell stack 1, therefore being a constant value, and similarly, $V_1$ and $V_2$ are constant values. Accordingly, the above-described formula (3) is a linear function between $P_1$ and $P_2$ and provides a graph descending toward the right side as illustrated in FIG. 4.

Accordingly, it is only necessary to perform the open and close operations of the anode pressure control valve 36 and the purge valve 37 when the fuel cell system 100 is stopped such that the first pipe pressure $P_1$ is positioned in a lower side region with respect to a straight line in FIG. 4. This ensures complying with the withstanding pressure of the fuel cell stack 1 at the next activation of the fuel cell system 100.

It should be noted that the above-described formulae (1) to (3) assume the remained gas as the ideal gas and do not consider an anode gas concentration change (for example, a change by the anode gas that reacts with oxygen or leaks from the pipe) and a change in the ambient temperature after the fuel cell system 100 is stopped. In particular, depending on the configuration of the fuel cell system 100, it is possible that the anode gas concentration remained inside the first pipe and the second pipe system decreases when a certain amount of time elapses after the system stop. Therefore, the first pipe pressure $P_1$ after the system stop is simply determined by considering the change in the anode gas concentration, the temperature, and similar factor as necessary.

In the embodiment, the controller 10 performs the open/close control of the anode pressure control valve 36 and the purge valve 37 when the fuel cell system 100 is stopped so as to satisfy the condition in FIG. 4. The following describes the control with the timing chart in FIG. 3.

FIG. 3 is to illustrate operations of respective parts and a command value from the start of the stop sequence of the fuel cell system 100 to the next activation of the fuel cell system 100. FIG. 3 (a) illustrates changes of the first pipe pressure $P_1$ and the second pipe pressure $P_2$. FIG. 3 (b) illustrates an actual opening degree of the anode pressure control valve 36. FIG. 3 (c) illustrates a duty command value to the anode pressure control valve 36 from the controller 10. FIG. 3 (d) illustrates an actual opening degree of the anode gas valve 35.

As soon as a user of the vehicle in which the fuel cell system 100 is mounted turns OFF an ignition key, the fuel cell system 100 performs the system stop sequence. It should be noted that, while in the embodiment, the activation and stop of the fuel cell system 100 is performed with the ignition key, the present invention is not limited to such a configuration. For example, the fuel cell system 100 of the present invention is mountable in a vehicle including, for example, a start button, instead of the ignition key.

As soon as the system stop sequence is started, the controller 10 sets a command duty ratio of the anode pressure control valve 36 and outputs the command duty ratio to the anode pressure control valve 36 in order to stop the fuel cell stack 1. The anode pressure control valve 36 performs a valve open operation on the basis of this command duty ratio. At this time, the controller 10 also gives a similar open command to the purge valve 37. Thus, as illustrated in FIG. 3 (a), the first pipe pressure $P_1$ and the second pipe pressure $P_2$ are gradually decreased.

Then, the controller 10 outputs the duty command value of closing valve to the anode pressure control valve 36. As soon as the anode pressure control valve 36 is closed, the fuel cell stack 1 inside the fuel cell system 100 stops. At this time, the first pipe pressure $P_1$ has a pressure lower than the illustrated predetermined pressure $P_0$.

It should be noted that, while in the embodiment, the fuel cell system 100 is stopped at a time point where the anode pressure control valve 36 is closed, a time point of a complete stop of the fuel cell system 100 is not limited to this case. For example, the fuel cell system 100 may perform a predetermined operation of the stop sequence after the anode pressure control valve 36 is closed, or alternatively, may open the anode pressure control valve 36 and the purge valve 37 after the stop sequence of the fuel cell system 100 is completely finished to cause the first pipe pressure $P_1$ to be less than the predetermined pressure $P_0$.

Then, during the stop of the fuel cell system 100, the second pipe pressure $P_2$ is gradually decreased by the anode gas and the cathode gas remained inside the fuel cell stack 1 reacting and the anode gas leaking outside the system.

Next, at the activation of the fuel cell system 100, that is, when the ignition key of the vehicle in which the fuel cell system 100 is mounted is ON, the controller 10 sets a command duty ratio of the anode pressure control valve 36 and outputs the command duty ratio to the anode pressure control valve 36 before a system activation sequence is started. The anode pressure control valve 36 performs a valve open operation on the basis of this command duty ratio.

As soon as the anode pressure control valve 36 opens, the anode gas inside the first pipe 32 flows into a side of the second pipe 33, thus providing an identical pressure $P_3$ ($P_3 < P_1$) as a whole. Since the first pipe pressure $P_1$ is already less than the predetermined pressure $P_0$ when the fuel cell system 100 is stopped, the inside of the fuel cell stack 1 cannot be equal to or more than the predetermined pressure $P_0$ even though the warm up of the anode pressure control valve 36 is performed. Accordingly, for example, a damage to the components in the fuel cell stack 1 can be prevented.

Figure 5:
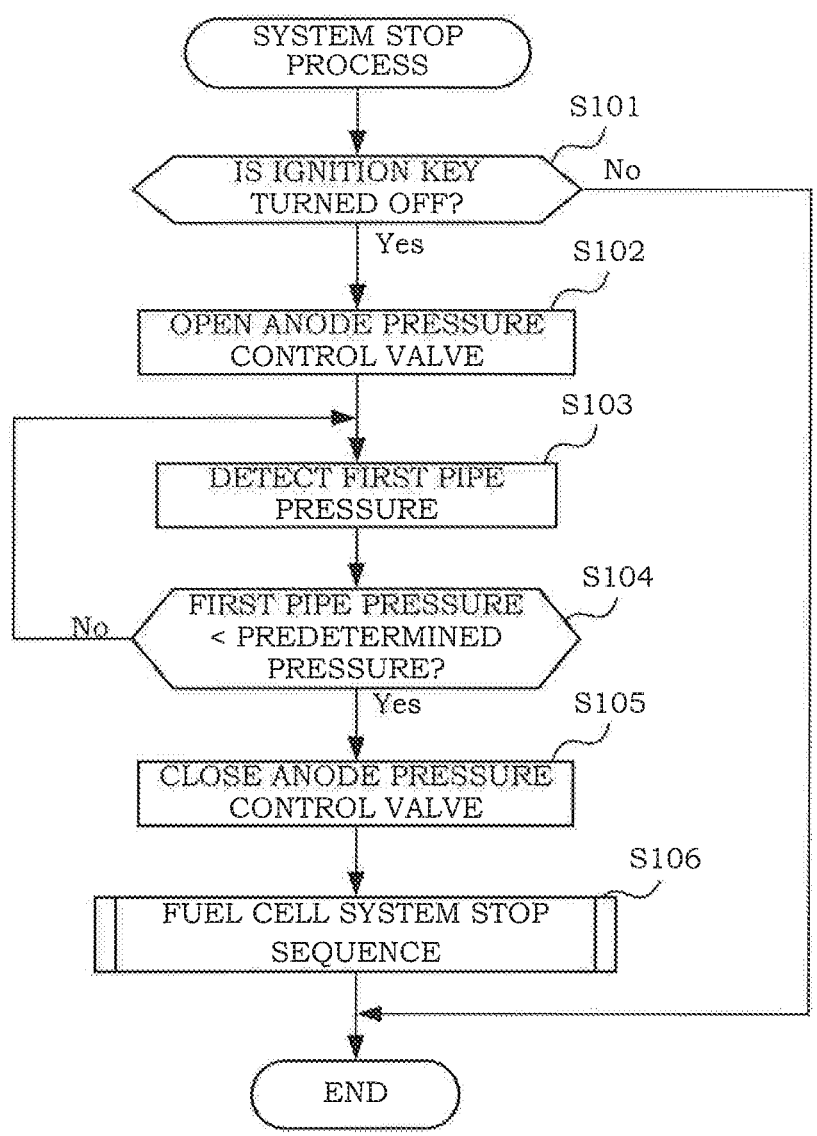
FIG. 5 is a flowchart illustrating a system stop process executed by a controller according to the embodiment.
Figure 6:
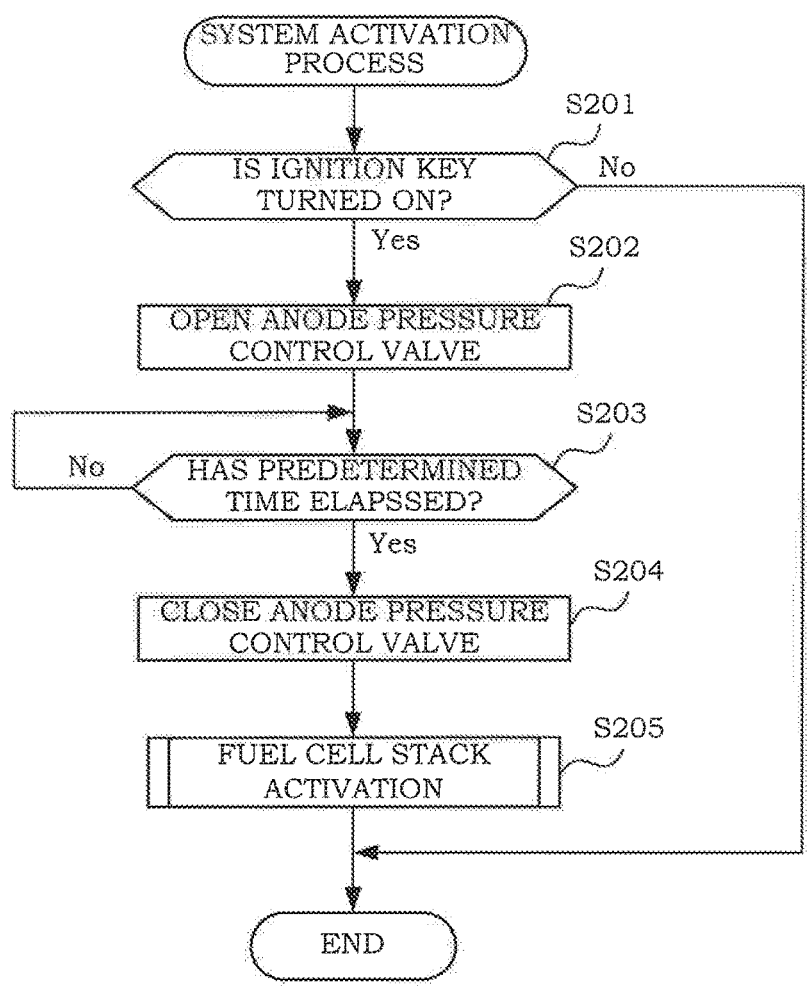
FIG. 6 is a flowchart illustrating a system activation process executed by the controller according to the embodiment.

Next, an operation of the fuel cell system 100 according to the embodiment will be described with reference to flowcharts in FIG. 5 and FIG. 6. FIG. 5 is a flowchart illustrating a system stop process executed by the controller 10 according to the embodiment. FIG. 6 is a flowchart illustrating a system activation process executed by the controller 10 according to the embodiment. It should be noted that the system stop process and the system activation process are executed at, for example, a predetermined time interval (for example, every 100 msec).

First, the system stop process will be described. In the system stop process, the controller 10, first, determines whether the ignition key is turned OFF by the user of the vehicle or not (Step S101). When it is determined that the ignition key is not turned OFF, the controller 10 terminates this system stop process.

On the other hand, when it is determined that the ignition key is turned OFF, the controller 10 opens the anode pressure control valve 36 (Step S102), and detects the pressure inside the first pipe, that is, the first pipe pressure $P_1$ using the first pipe pressure sensor 38 (Step S103).

Next, the controller 10 determines whether the first pipe pressure $P_1$ detected at Step S103 is less than the predetermined pressure $P_0$ or not (Step S104). When it is determined that the first pipe pressure $P_1$ is not less than the predetermined pressure $P_0$, the controller 10 repeats the process at Steps S103 and S104.

On the other hand, when it is determined that the first pipe pressure $P_1$ is less than the predetermined pressure $P_0$, the controller 10 closes the anode pressure control valve 36 (Step S105), and executes the system stop sequence of the fuel cell system 100 (Step S106), and then, terminates this system stop process. It should be noted that the system stop sequence is simply performed by a known method corresponding to a system configuration of the fuel cell system 100; therefore, the detailed explanation will not be elaborated here.

Next, the system activation process will be described. In the system activation process, the controller 10, first, determines whether the ignition key is turned ON by the user of the vehicle or not (Step S201). When it is determined that the ignition key is not turned ON, the controller 10 terminates this system activation process.

On the other hand, when it is determined that the ignition key is turned ON, the controller 10 opens the anode pressure control valve 36 (Step S202). Then, the controller 10 measures a time from the anode pressure control valve 36 is opened to determine whether a predetermined time has elapsed or not (Step S203). The controller 10 stands by at Step S203 until the predetermined time elapses.

When it is determined that the predetermined time has elapsed, the controller 10 closes the anode pressure control valve 36 (Step S204), executes the activation sequence to activate the fuel cell stack 1 (Step S205), and terminates this system activation process. It should be noted that the activation sequence of the fuel cell stack 1 is simply performed by a known method corresponding to a system configuration of the fuel cell system 100; therefore, the detailed explanation will not be elaborated here.

Figure 7:
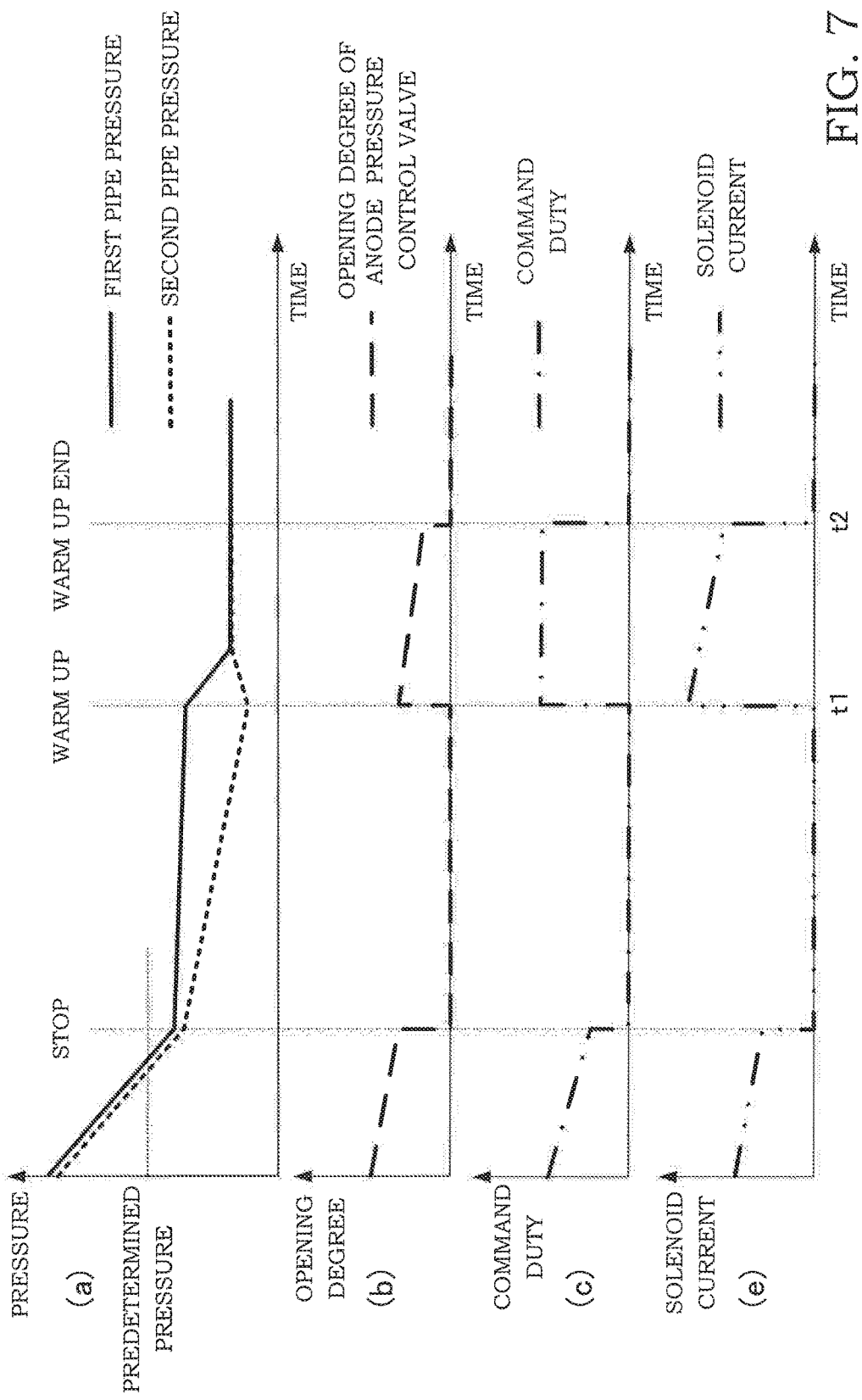
FIG. 7 is another timing chart illustrating a stopping and activating method for the fuel cell system of the embodiment.

Here, a description will be given of a solenoid current supplied to the solenoid coil of the anode pressure control valve 36 corresponding to the timing chart in FIG. 3. FIG. 7 is a timing chart of the solenoid current corresponding to the timing chart in FIG. 3. FIG. 7 (a) to (c) are similar to FIG. 3 (a) to (c); therefore, the detailed explanation will not be elaborated.

FIG. 7 (e) illustrates the solenoid current supplied to the solenoid coil of the anode pressure control valve 36. The controller 10 outputs a solenoid current command value as well as the duty command value to the anode pressure control valve 36 as soon as the system stop sequence of the fuel cell system 100 is started. The anode pressure control valve 36 performs the valve open operation on the basis of these duty command value and solenoid current command value.

At the activation of the fuel cell system 100, the controller 10 sets the command duty ratio and the solenoid current command value of the anode pressure control valve 36 and outputs the command duty ratio and the solenoid current command value to the anode pressure control valve 36 before the system activation sequence is started. The anode pressure control valve 36 performs the valve open operation on the basis of the command duty ratio and the solenoid current command value.

The controller 10 warms up the anode pressure control valve 36 by continuing the solenoid current command value for a predetermined time. The predetermined time is, for example, approximately one to several seconds. Thus, applying the current to the solenoid coil of the anode pressure control valve 36 for the predetermined time causes the electrical resistance of the solenoid coil of the anode pressure control valve 36 and the sliding resistance of the plunger to be approximately identical to those in the normal operation; therefore, the request of the anode gas boost speed inside the fuel cell stack 1 can be satisfied in the system activation sequence thereafter.

It should be noted that, while in FIG. 7 (e), it is illustrated that the solenoid current is large when the anode pressure control valve 36 is warmed up compared with that in the system stop sequence, a value of the solenoid current is in fact determined on the basis of the ambient temperature (an environmental temperature of the fuel cell system 100) of the anode pressure control valve 36 detected by the temperature sensor 60. The following briefly describes a determination method of the solenoid current with reference to FIG. 8.

Figure 8:
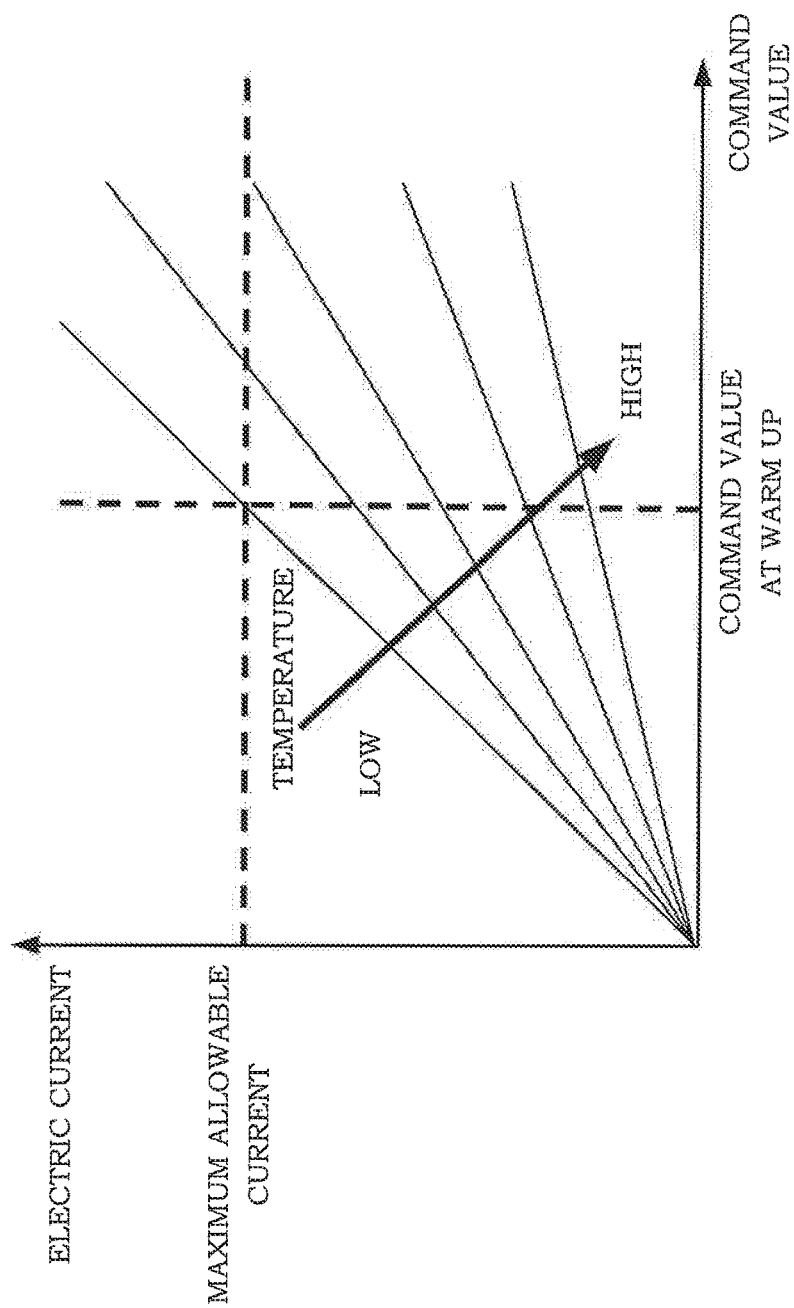
FIG. 8 is a graph illustrating a relation between a solenoid current and an ambient temperature in an anode pressure control valve.

FIG. 8 is a graph illustrating a relation between the solenoid current that should be supplied to the anode pressure control valve 36 and the ambient temperature of the anode pressure control valve 36. As illustrated in FIG. 8, the maximum allowable current value by a quality assurance is set for the solenoid current. A plurality of straight lines radially extending indicate the solenoid current values at respective temperatures.

As can be seen from FIG. 8, a solenoid current value corresponding to a predetermined command value at warming up becomes high as the ambient temperature is low. In the embodiment, the controller 10 determines the solenoid current value on the basis of the ambient temperature of the anode pressure control valve 36 detected by the temperature sensor 60 by referring to this graph.

Next, a description will be given of a flow-in state of the anode gas into the second pipe 33 when the anode pressure control valve 36 is warmed up. The following separately describes the case where the first pipe pressure $P_1$ is less than the predetermined pressure $P_0$ (region A) and the case where the first pipe pressure $P_1$ is equal to or more than the predetermined pressure $P_0$. For the case where the first pipe pressure $P_1$ is equal to or more than the predetermined pressure $P_0$, the description is further separated into the case where the first pipe pressure $P_1$ is less than a second predetermined pressure (region X) and the case where the first pipe pressure $P_1$ is equal to or more than the second predetermined pressure (region B). It should be noted that, hereinafter, the second predetermined pressure is $P_{02}$ as necessary.

Figure 9:
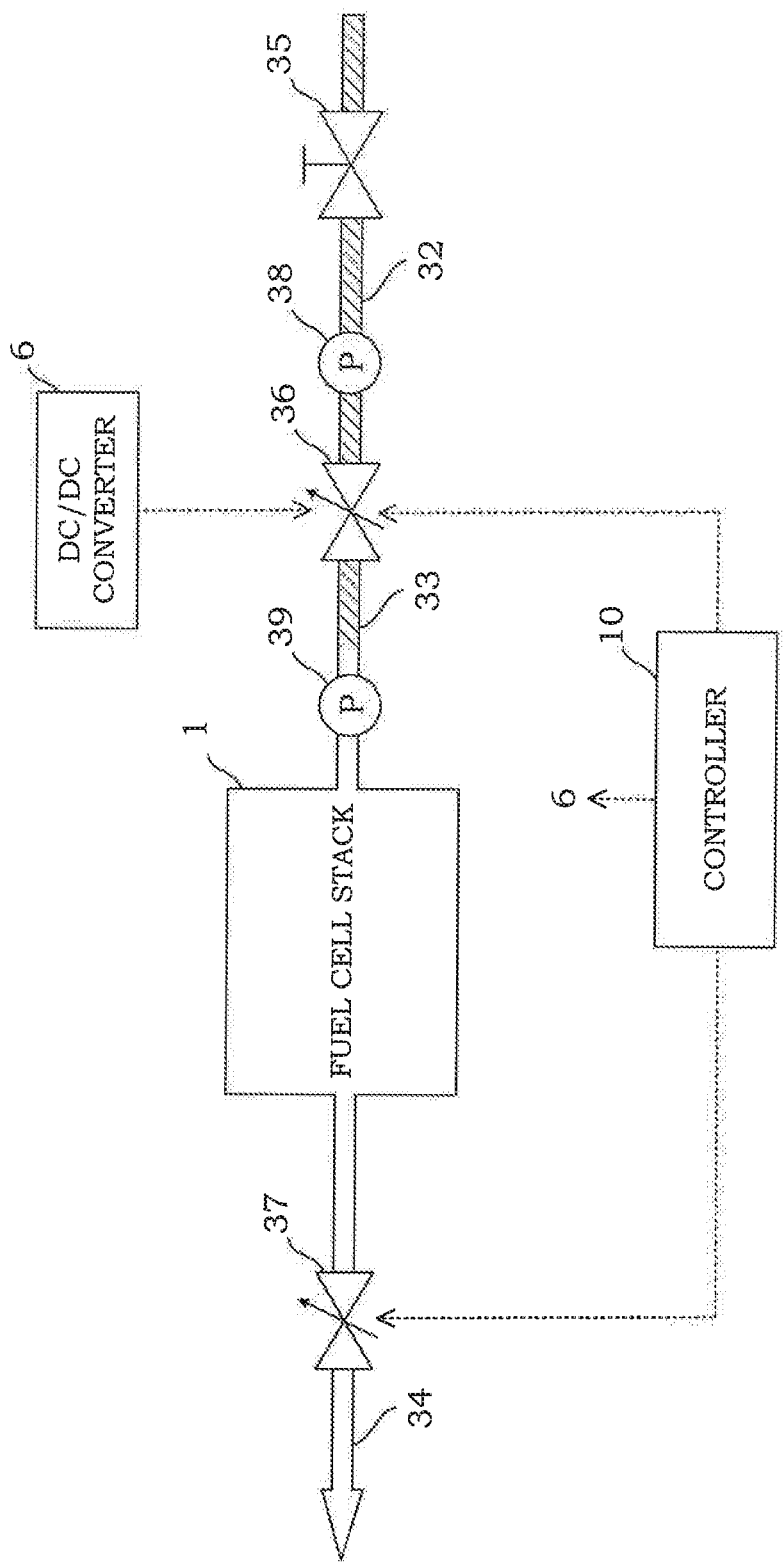
FIG. 9 is a drawing illustrating a flow-in state of an anode gas when the anode pressure control valve is warmed up in the case where the first pipe pressure is less than a predetermined pressure.

First, a description will be given of the case where the first pipe pressure $P_1$ is less than the predetermined pressure $P_0$. FIG. 9 illustrates the flow-in state of the anode gas when the anode pressure control valve 36 is warmed up in the case where the first pipe pressure $P_1$ is less than the predetermined pressure $P_0$. The anode gas has flown into a portion indicated by diagonal lines in the first pipe 32 and the second pipe 33. Thus, when the first pipe pressure $P_1$ is less than the predetermined pressure $P_0$, the anode gas flows up to a middle of the second pipe 33.

When a sufficient period elapses after the fuel cell system 100 is stopped, the cathode gas and the anode gas remained inside the fuel cell stack 1 are mixed by cross leakage, thereby causing oxygen to exist also in an anode gas flow passage (not illustrated) inside the fuel cell stack 1. Therefore, after the anode pressure control valve 36 is warmed up, there is provided a state where a boundary surface (a hydrogen front) between the anode gas and a remained gas (including the cathode gas) exists in the anode gas supply passage and the anode gas flow passage.

In the embodiment, the anode pressure control valve 36 is closed after the first pipe pressure $P_1$ is depressurized to less than the predetermined pressure $P_{01}$ when the fuel cell system 100 is stopped; therefore, the boundary surface (the hydrogen front) is not generated inside the fuel cell stack 1 even when the anode pressure control valve 36 is warmed up. Accordingly, for example, a catalyst degradation inside the fuel cell stack 1 can be effectively prevented.

Next, a description will be given of the case where the first pipe pressure $P_1$ is equal to or more than the predetermined pressure $P_{01}$ and less than the second predetermined pressure $P_{02}$. Here, a brief description will be given of a timing chart from the start of the system stop sequence of the fuel cell system 100 to the next activation of the fuel cell system 100.

Figure 10:
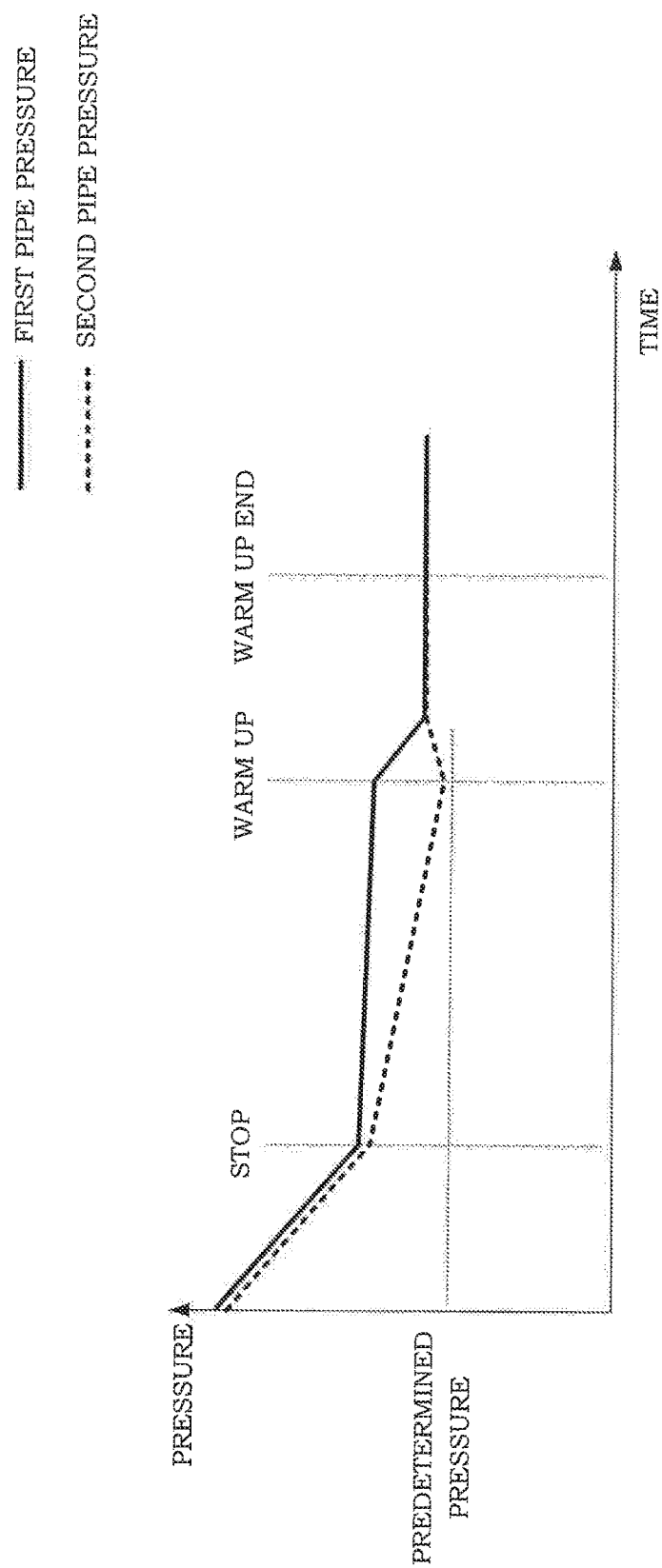
FIG. 10 is a timing chart when the fuel cell system is stopped with the first pipe pressure is equal to or more than the predetermined pressure.

FIG. 10 is a timing chart when the fuel cell system 100 is stopped with the first pipe pressure $P_1$ being equal to or more than the predetermined pressure $P_{01}$. In this case, as illustrated in FIG. 10, the fuel cell system 100 is stopped in a state where the first pipe pressure $P_1$ and the second pipe pressure $P_2$ are equal to or more than the predetermined pressure $P_{01}$. Then, during the stop of the fuel cell system 100, the second pipe pressure $P_2$ is gradually decreased by the anode gas and the cathode gas remained inside the fuel cell stack 1 reacting and the anode gas leaking outside the system.

However, the first pipe pressure $P_1$ hardly changes; therefore, the entire pressure of the anode system from the anode pressure control valve 36 to the purge valve 37 including the first pipe 32 and the second pipe 33 becomes equal to or more than the predetermined pressure $P_{01}$ when the anode pressure control valve 36 is warmed up.

Figure 11:
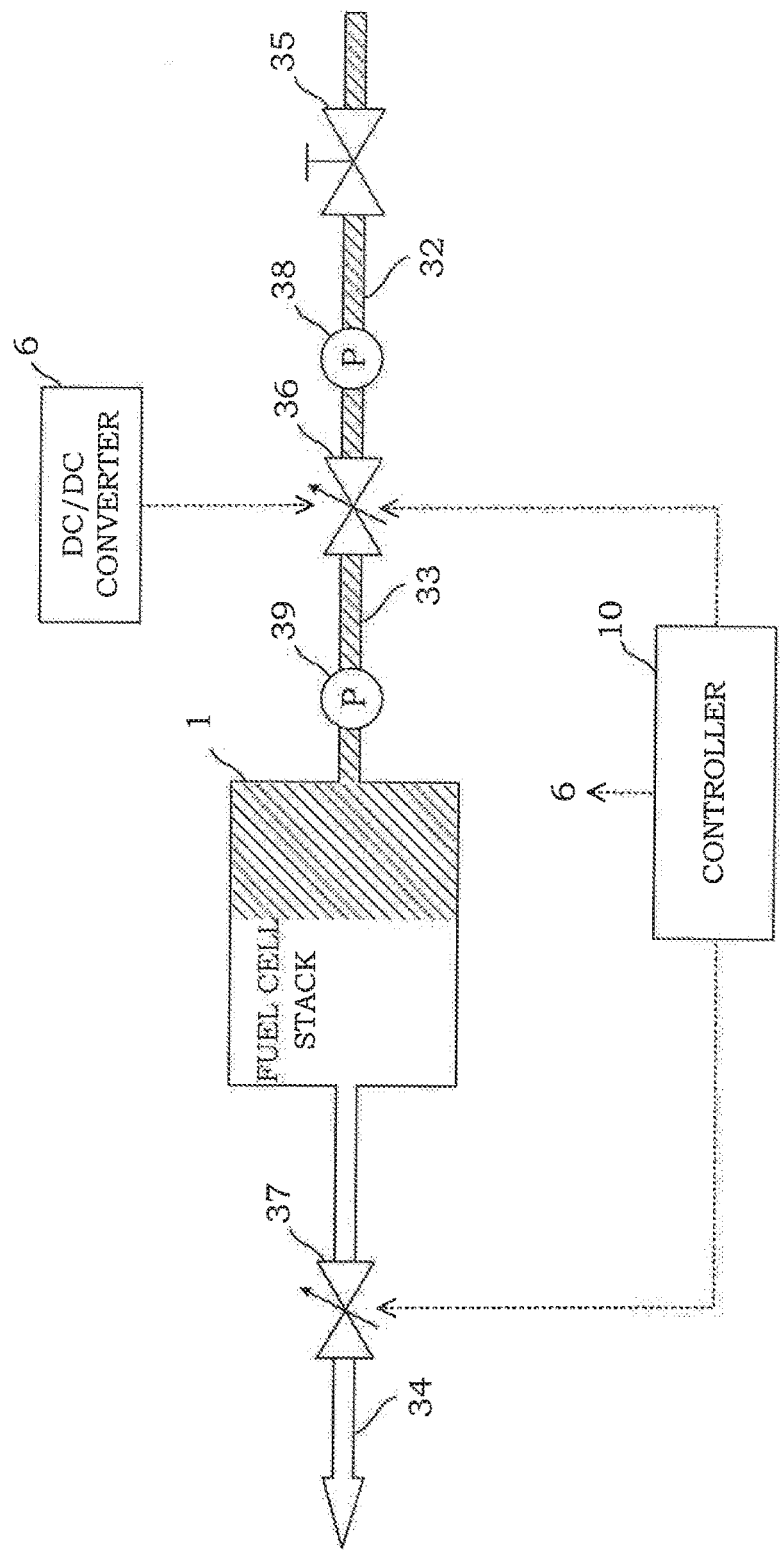
FIG. 11 is a drawing illustrating a flow-in state of the anode gas when the anode pressure control valve is warmed up in the case where the first pipe pressure is equal to or more than the predetermined pressure.

FIG. 11 is a drawing illustrating a flow-in state of the anode gas when the anode pressure control valve 36 is warmed up in the case where the first pipe pressure $P_1$ is equal to or more than the predetermined pressure $P_{01}$. The anode gas has flown into a portion indicated by the diagonal lines in the first pipe 32, the second pipe 33, and the fuel cell stack 1. In this case, as illustrated in FIG. 11, the boundary surface (the hydrogen front) between the remained gas and the anode gas exists inside the fuel cell stack 1. Therefore, a local cell in which the upstream of the anode gas flow passage inside the fuel cell stack 1 is an anode electrode and the downstream is a cathode electrode is formed in a side of the anode electrode. At a proximity of the boundary surface (the hydrogen front), carbon of a catalyst layer inside the fuel cell stack 1 is deteriorated due to the reaction of the anode gas with the cathode gas.

Accordingly, such a problem can be prevented from occurring by causing the first pipe pressure $P_1$ to be less than the predetermined pressure $P_{01}$ when the fuel cell system 100 is stopped as in the fuel cell system 100 according to the embodiment.

Figure 12:
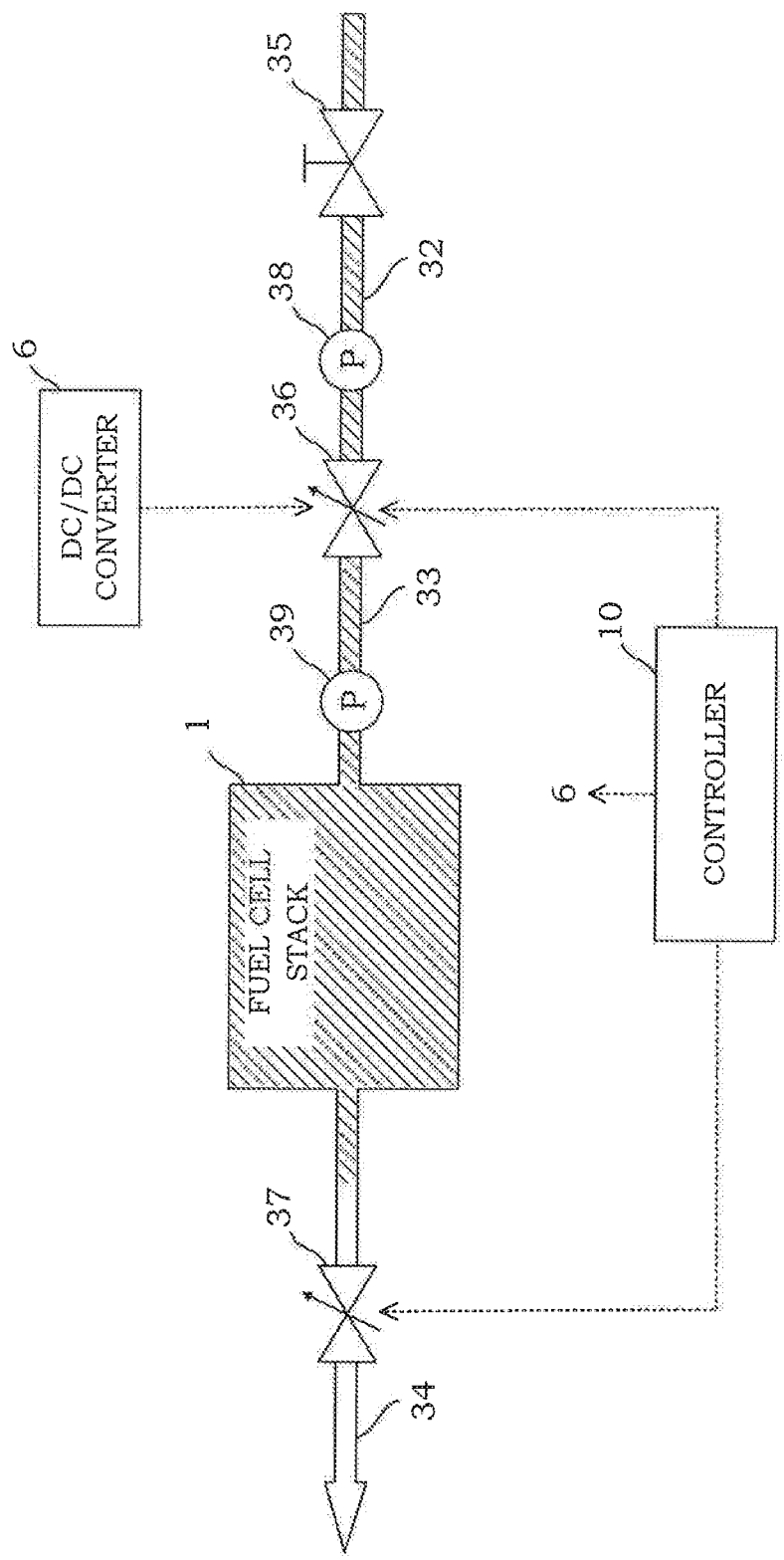
FIG. 12 is a drawing illustrating a flow-in state of the anode gas when the anode pressure control valve is warmed up in the case where the first pipe pressure is equal to or more than a second predetermined pressure.

Next, a description will be given of the case where the first pipe pressure $P_1$ is equal to or more than the second predetermined pressure $P_{02}$. FIG. 12 is a drawing illustrating a flow-in state of the anode gas when the anode pressure control valve 36 is warmed up in the case where the first pipe pressure $P_1$ is equal to or more than the second predetermined pressure $P_{02}$. The anode gas has flown into portions indicated with the diagonal lines in the first pipe 32, the second pipe 33, the fuel cell stack 1, and the anode gas discharge passage 34.

In this case, the boundary surface between the remained gas and the anode gas exists on the anode gas discharge passage 34. Accordingly, the above-described problem of the catalyst degradation and the like due to the reaction between the anode gas and the cathode gas does not occur. In the embodiment, the first pipe pressure $P_1$ may be adjusted to equal to or more than the second predetermined pressure $P_{02}$ instead of adjusting the first pipe pressure $P_1$ to less than the predetermined pressure $P_0$. It should be noted that, even in this case, the second predetermined pressure $P_{02}$ is set to a pressure smaller than (the maximum value of) the durability pressure $P_{max}$ that reduces the degradation of the durability of the fuel cell stack 1 at the activation of the fuel cell system 100.

Figure 13:
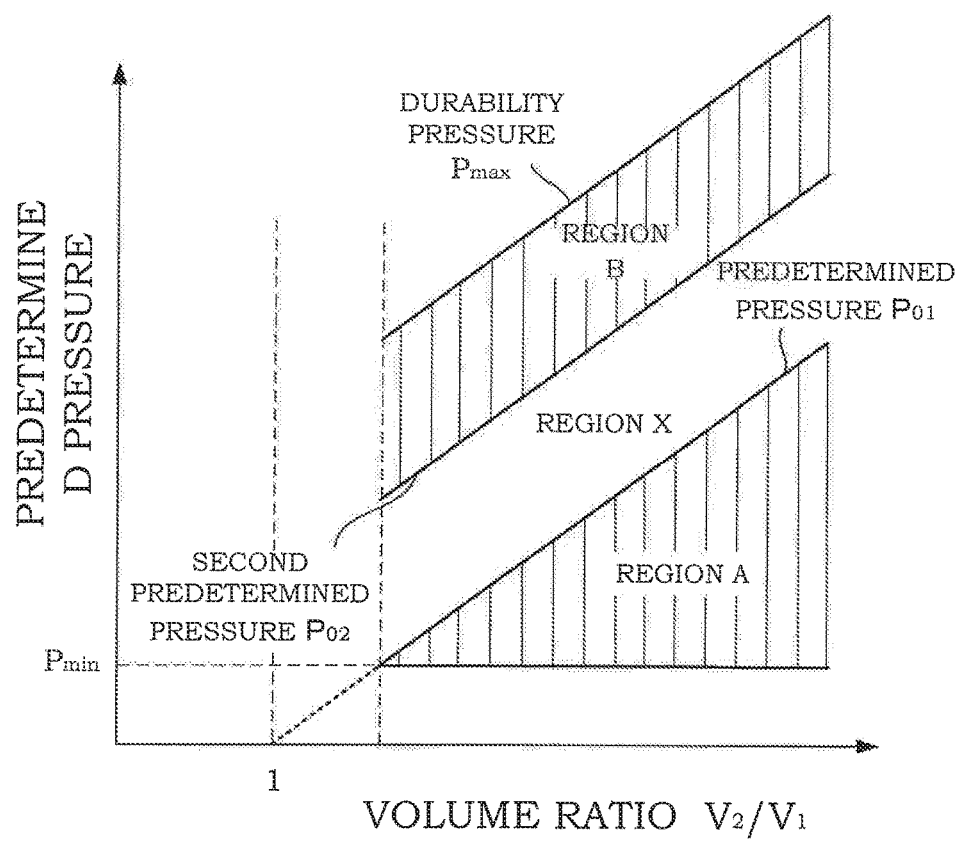
FIG. 13 is a graph illustrating a relation between a volume ratio of a second pipe system to a first pipe and the predetermined pressure.

Here, a description will be given of a relation between a volume ratio $V_2/V_1$, which is a volume ratio of the volume $V_2$ of the second pipe system to the volume $V_1$ of the first pipe 32 described above, and the above-described respective regions A, B, and X. FIG. 13 is a graph illustrating relations between the volume ratio $V_2/V_1$ of the second pipe system to the first pipe 32, and the predetermined pressure $P_{01}$ and the second predetermined pressure $P_{02}$.

The boundary surface between the anode gas and the remained gas does not exist inside the fuel cell stack 1 when the predetermined pressure is in the region A and the region B; therefore, the fuel cell system 100 is only necessary to be designed such that the volume ratio $V_2/V_1$ falls within a portion with vertical lines illustrated in FIG. 13. It should be noted that a region between the two regions A and B defines the region X, the region A corresponds to the predetermined pressure $P_{01}$, and the region B corresponds to the second predetermined pressure $P_{02}$. It should be noted that an upper limit of the region B indicates the maximum value $P_{max}$ of the durability pressure.

In the embodiment, $P_{min}$ is set as a lower limit value of the predetermined pressure considering a hydrogen retention capacity of the fuel cell stack 1 at the activation of the fuel cell system 100. This "hydrogen retention capacity" means a condition to effectively cause the electrode reaction inside the fuel cell stack 1 at the next activation of the fuel cell system 100.

That is, the predetermined pressure is only necessary to be equal to or more than the pressure (the lower limit pressure) $P_{min}$ that corresponds to an amount of the anode gas to be remained inside the fuel cell stack 1 after the fuel cell system 100 is stopped. Therefore, in FIG. 13, a portion less than the lower limit pressure $P_{min}$ in the region A is excluded from the portion with the vertical lines.

In the embodiment, the fuel cell system 100 configured so as to thus set the predetermined pressure ensures obtaining the hydrogen retention capacity in whatever activation condition and satisfying the request of the anode gas boost speed inside the fuel cell stack 1, and furthermore, ensures reducing the overshooting of the anode gas pressure. The predetermined pressure being the pressure that satisfies the durability pressure of the fuel cell stack 1 ensures effectively preventing the damage to, for example, each electrode and electrolyte membrane inside the fuel cell stack 1.

Figure 14:
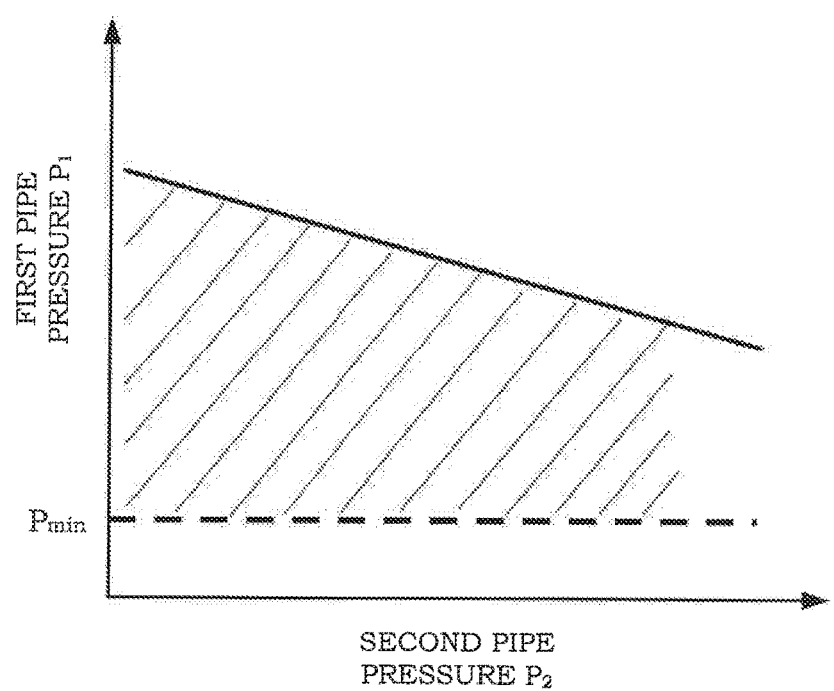
FIG. 14 is another graph illustrating a relation between the first pipe pressure and the second pipe pressure when the fuel cell system is stopped.

Taking the regions in FIG. 13 into consideration, the relation between the first pipe pressure and the second pipe pressure in FIG. 4 has a portion excluded as illustrated in FIG. 14. FIG. 14 is another graph illustrating a relation between the first pipe pressure $P_1$ and the second pipe pressure $P_2$ when the fuel cell system is stopped. A portion with diagonal lines illustrated in FIG. 14 is a region in which the first pipe pressure $P_1$ and the second pressure $P_2$ satisfy the condition of the embodiment.

As described above, the fuel cell system 100 according to the embodiment is the fuel cell system 100 that supplies the anode gas and the cathode gas to the fuel cell stack 1 (the fuel cell) to cause the fuel cell stack 1 to generate the electricity. The fuel cell system 100 includes the high pressure tank 31, which stores the anode gas supplied to the fuel cell stack 1 in a high pressure, the anode gas supply passage constituted of the first pipe 32 and the second pipe 33 to supply the anode gas from the high pressure tank 31 to the fuel cell stack 1, the anode pressure control valve 36, which is disposed on the anode gas supply passage and adjusts the anode gas pressure of the fuel cell stack 1, the anode gas valve 35, which is disposed between the high pressure tank 31 and the anode pressure control valve 36 and adjusts a source pressure of the anode pressure control valve 36, and the controller 10, which serves as a valve control unit that controls opening and closing of the anode pressure control valve 36 and the anode gas valve 35 on the basis of the operating state of the fuel cell system 100. The controller 10 controls the anode pressure control valve 36 and then close the anode pressure control valve 36 after the controller 10 closes the anode gas valve 35 such that the first pipe pressure $P_1$, which is the pressure inside the first pipe 32 between the anode gas valve 35 and the anode pressure control valve 36 in the anode gas supply passage, becomes less than the predetermined pressure before the fuel cell system 100 is stopped. The controller 10 opens the anode pressure control valve 36 at the activation of the fuel cell system 100. The predetermined pressure is configured to be smaller than the pressure that degrades the durability of the fuel cell stack 1 at the activation of the fuel cell system 100. Since the fuel cell system 100 according to the embodiment is thus configured, the following action and effect are provided.

That is, in the fuel cell system 100 according to the embodiment, the first pipe pressure $P_1$, which is the pressure in the first pipe 32 in the anode gas supply passage, is configured to be the predetermined pressure (the pressure smaller than the pressure that degrades the durability of the fuel cell stack 1) smaller than the maximum value $P_{max}$ of the durability pressure when the system is stopped. Therefore, the damage to, for example, each electrode and electrolyte membrane inside the fuel cell stack 1 can be effectively prevented even when the anode pressure control valve 36 is opened for warming up the anode pressure control valve 36 at the activation of the system.

In the fuel cell system 100 according to the embodiment, the predetermined pressure is only necessary to be the pressure with which the boundary surface between the anode gas inside the first pipe 32 and the remained gas inside the second pipe 33 between the anode pressure control valve 36 and the fuel cell stack 1 is outside the fuel cell stack 1 (that is, the boundary surface does not stay inside the fuel cell stack 1) when the anode pressure control valve 36 is opened at the activation of the fuel cell system 100. That is, in the above-described embodiment, the predetermined pressure is only necessary to be the pressure that provides the state illustrated in FIG. 9 or FIG. 12. As soon as there provides a state where the boundary surface (the hydrogen front) between the anode gas and the remained gas (including the cathode gas) exists inside the fuel cell stack 1, the local cell with the upstream of the anode gas flow passage inside the fuel cell stack 1 as the anode electrode and the downstream as the cathode electrode is formed in the anode electrode side. At the proximity of the boundary surface (the hydrogen front), the carbon of the catalyst layer inside the fuel cell stack 1 is deteriorated due to the reaction of the anode gas with the cathode gas. Thus setting the predetermined pressure ensures effectively preventing, for example, the deterioration of the catalyst layer inside the fuel cell stack 1.

In the fuel cell system 100 according to the embodiment, the predetermined pressure is only necessary to be equal to or more than the pressure necessary at the activation of the fuel cell system 100 (that is, the pressure necessary for activating the fuel cell system 100). With this, there is no influence on the above-described hydrogen retention capacity.

In another aspect of the embodiment, the fuel cell system 100 is the fuel cell system 100 that supplies the anode gas and the cathode gas to the fuel cell stack 1 to cause the fuel cell stack 1 to generate the electricity. The fuel cell system 100 includes the high pressure tank 31, which stores the anode gas supplied to the fuel cell stack 1 in a high pressure, the anode gas supply passage constituted of the first pipe 32 and the second pipe 33 to supply the anode gas from the high pressure tank 31 to the fuel cell stack 1, the anode pressure control valve 36, which is disposed on the anode gas supply passage and adjusts the anode gas pressure of the fuel cell stack 1, the anode gas valve 35, which is disposed between the high pressure tank 31 and the anode pressure control valve 36 and adjusts a source pressure of the anode pressure control valve 36, and the controller 10, which serves as a valve control unit that controls opening and closing of the anode pressure control valve 36 and the anode gas valve 35 on the basis of the operating state of the fuel cell system 100. The controller 10 controls the first pipe pressure $P_1$, which is the pressure inside the first pipe 32 between the anode gas valve 35 and the anode pressure control valve 36 in the anode gas supply passage, to be a predetermined operation pressure while the fuel cell system 100 is operating. The controller 10 depressurizes the first pipe pressure $P_1$ to the predetermined pressure lower than the predetermined operation pressure and then close the anode pressure control valve 36 after the controller 10 closes the anode gas valve 35 before the fuel cell system 100 is stopped and open the anode pressure control valve 36 at the activation of the fuel cell system 100. Thus, the first pipe pressure $P_1$ is decreased to the predetermined pressure lower than the predetermined operation pressure when the fuel cell system 100 is stopped. Therefore, the damage to, for example, each electrode and electrolyte membrane inside the fuel cell stack 1 can be effectively prevented even when the anode pressure control valve 36 is opened for warming up the anode pressure control valve 36 at the activation of the system, similarly to the above.

In the fuel cell system 100 according to the embodiment, the current command value supplied to the anode pressure control valve 36 at the activation of the fuel cell system 100 is only necessary to be the command value of the current within a guaranteed range of the anode pressure control valve 36 even in a condition (usually a condition at the minimum temperature in the usage environment) where the electrical resistance becomes the smallest in the usage condition where the anode pressure control valve 36 is used. For example, when the fuel cell system 100 is activated below zero, while a current is applied to the solenoid coil of the anode pressure control valve 36 in order to warm up the anode pressure control valve 36, the electrical resistance of the solenoid coil and the sliding resistance of the plunger are small. Therefore, applying the voltage of a normal voltage value increases the current value. Then, in the case of a condition where the current outside the range of the specification for the anode pressure control valve 36 is applied, it is possible to damage the anode pressure control valve 36. Therefore, the embodiment uses the command value that does not cause the current applied to the solenoid coil to be equal to or more than the predetermined value when the anode pressure control valve 36 is warmed up.

In the fuel cell system 100 according to the embodiment, the controller 10 is configured to supply the current to the anode pressure control valve 36 at the activation of the fuel cell system 100 and finish the supply of the current when the predetermined time elapses. Thus, applying the current to the anode pressure control valve 36 for the predetermined time is determined to be a completion of the warm up of the anode pressure control valve 36, and then the controller 10 simply terminates the current supply. It should be noted that the "predetermined time" is simply set by, for example, an experiment in advance. Here, applying the current to warm up the anode pressure control valve 36 warms the solenoid coil due to the current application, thus, increasing the electrical resistance. Therefore, the current is gradually decreased, and it is also possible to determine the completion of the warm up after confirming the state.

It should be noted that, in the above-described embodiment, while the illustration is omitted, determining the warm up completion of the anode pressure control valve 36 is simply performed in a state where the current is supplied to the anode pressure control valve 36 using the DC/DC converter 6 after a device of a power electric system of the fuel cell system 100 is activated. Thus, the completion of the warm up of the anode pressure control valve 36 is determined on the basis of the current value supplied to the anode pressure control valve 36 after a power electric system activation sequence of the fuel cell system 100 is operated. It is preferred to make a determination after the power supply voltage is stabilized to be constant in order to increase a determination accuracy of the warm up time (the above-described "predetermined time") of the anode pressure control valve 36. In view of this, it is only necessary to determine the completion of the warm up after the activation of the DC/DC converter 6. It should be noted that in the case where the current is supplied from a low electric battery (not illustrated), a voltage of the low electric battery fluctuates by, for example, the ambient temperature; therefore, it is considered that the warm up determination by the current applied to the anode pressure control valve 36 is low in reliability. In the embodiment, for a better safety, the current is supplied to the anode pressure control valve 36 via the DC/DC converter 6.

In the above-described embodiment, while a specific description has not been made, it is also possible to determine the warm up completion using the temperature sensor 60 for detecting the ambient temperature of the anode pressure control valve 36. That is, as soon as the warm up of the anode pressure control valve 36 is started, the ambient temperature of the anode pressure control valve 36 may be measured using the temperature sensor 60 and the warm up completion may be determined when the condition that the ambient temperature becomes equal to or more than the predetermined temperature is satisfied.

Applying the current to open the anode pressure control valve 36 causes a heat generation in the solenoid coil inside to increase the ambient temperature. On the basis of this ambient temperature increase, the completion of the warm up of the anode pressure control valve 36 may be determined. In this case, it is also possible to determine the completion of the warm up not only by the ambient temperature becoming equal to or more than the predetermined temperature, but also by, for example, the ambient temperature increasing by a certain temperature from before the start of the warm up. This ensures confirming an abnormal heat generation of the anode pressure control valve 36 even in the condition where the current value cannot be measured, thereby ensuring preventing such a condition from occurring.

In the above-described embodiment, while a specific description has not been made, a necessity to warm up the anode pressure control valve 36 may be determined using the temperature sensor 60 for detecting the ambient temperature of the anode pressure control valve 36. In this case, the temperature sensor 60 detects the temperature before the warm up of the anode pressure control valve 36 and when the detected ambient temperature is less than the predetermined temperature, it is only necessary to be configured such that the warm up of the anode pressure control valve 36 is executed at the activation of the fuel cell system 100. This configuration ensures, by not executing the warm up when the warm up of the anode pressure control valve 36 is not necessary, preventing a wasteful use of the electric power of the fuel cell system 100 and shortening the activation time of the fuel cell system 100.

It should be noted that the "predetermined temperature" in this case is determined by, for example, an experiment in advance. That is, a relation between the ambient temperature and an external temperature at the activation and the electrical resistance, a control accuracy (an overshooting amount) of the solenoid coil then is obtained by the experiment, and then it is only necessary to set the allowed temperature as the predetermined temperature. Taking the control accuracy into consideration is because the electrical resistance of the solenoid coil and the sliding resistance of the plunger are changed by the ambient temperature, thus, affecting the opening degree of the anode pressure control valve 36.

In the above-described embodiment, while the temperature sensor 60 for detecting the ambient temperature of the anode pressure control valve 36 is disposed, it may be substituted with an external temperature sensor that detects the external temperature, a cooling water temperature sensor that detects the temperature of the cooling water for cooling the fuel cell stack 1, and similar sensor.

Second Embodiment

The following describes a second embodiment of the present invention focusing mainly on differences from the first embodiment. It should be noted that the overall configuration of the fuel cell system 100 is similar; therefore, an operation of the fuel cell system 100 according to the embodiment will be described using FIG. 1 and FIG. 2. In the embodiment, for parts that provide functions similar to those in the above-described first embodiment, identical reference numerals are used to appropriately omit duplicate explanations.

In the above-described first embodiment, the first pipe pressure $P_1$, which is the pressure inside the first pipe 32, is not increased to the pressure of the normal operation after the completion of the warm up of the anode pressure control valve 36 but it is configured to be executed at the predetermined time point in the system activation sequence. In this embodiment, it is configured such that the pressure inside the first pipe 32 is increased to the pressure at the normal operation in the system activation process.

Figure 15:
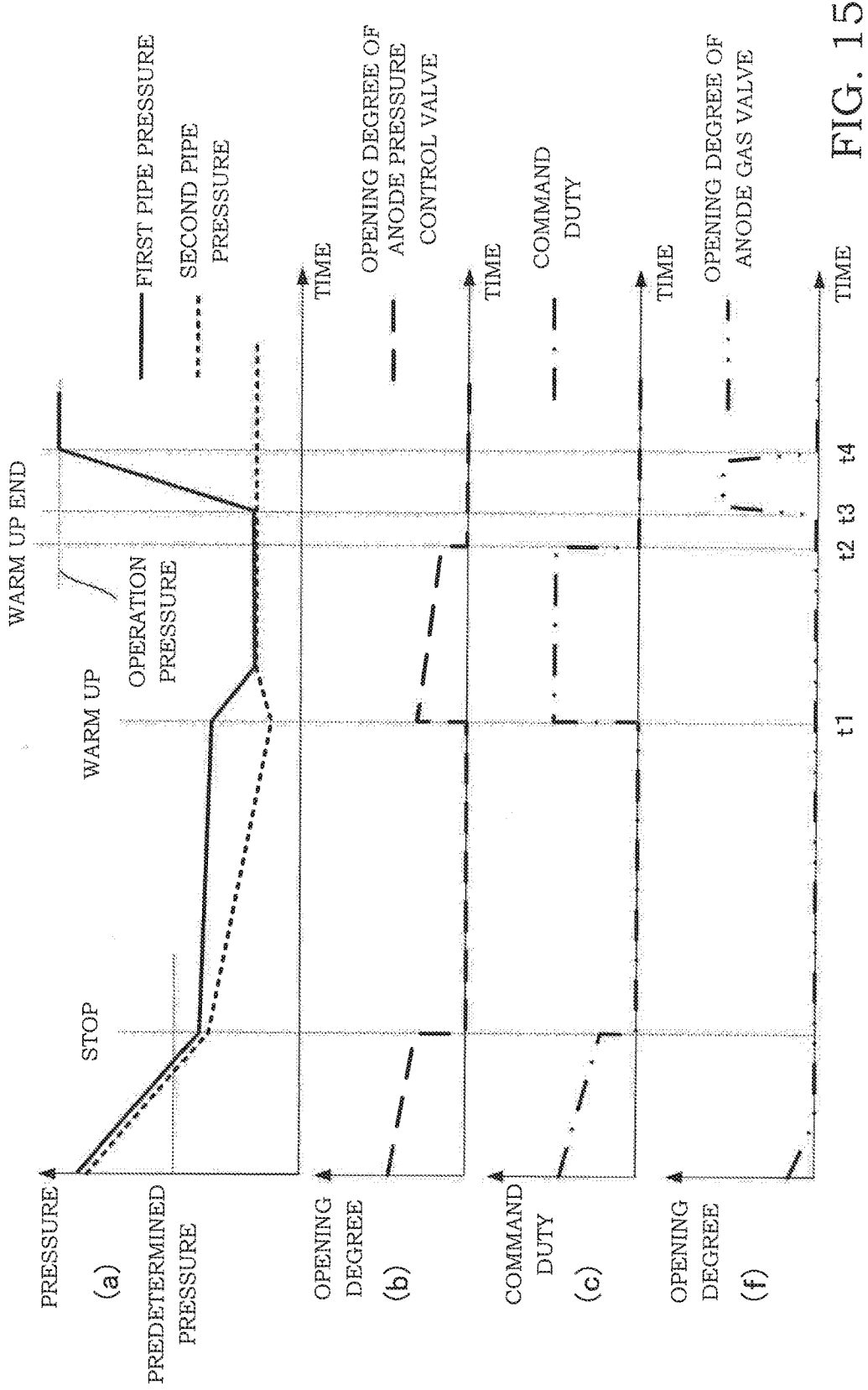
FIG. 15 is a timing chart illustrating a stopping and activating method for the fuel cell system in a second embodiment.

FIG. 15 is a timing chart that illustrates a stop and activation method for the fuel cell system according to the second embodiment. FIG. 15 (a) to (c) are similar to FIG. 3 (a) to (c); therefore, the detailed description will not be elaborated. FIG. 15 (f) illustrates the opening degree of the anode gas valve 35. At the activation of the fuel cell system 100, the warm up of the anode pressure control valve 36 is performed. After the completion of the warm up, the anode gas valve 35 is opened to boost the first pipe pressure $P_1$, which is the pressure inside the first pipe 32, to the predetermined operation pressure. This ensures shortening the activation time of the fuel cell system 100 and obtaining a pressure control accuracy by the anode pressure control valve 36.

It should be noted that, while a specific description has not been made in the first embodiment, the pressure of the anode gas stored inside the high pressure tank 31 is, for example, approximately 70 MPa (megapascal), the first pipe pressure $P_1$ between the anode gas valve 35 and the anode pressure control valve 36 is, for example, approximately two to four MPa, and the second pipe pressure $P_2$ adjusted by the anode pressure control valve 36 is, for example, approximately 200 kPa.

Next, a description will be given of an operation of the fuel cell system 100 according to the embodiment. It should be noted that the system stop process is identical to the flowchart in FIG. 5; therefore, only the system activation process will be described.

Figure 16:
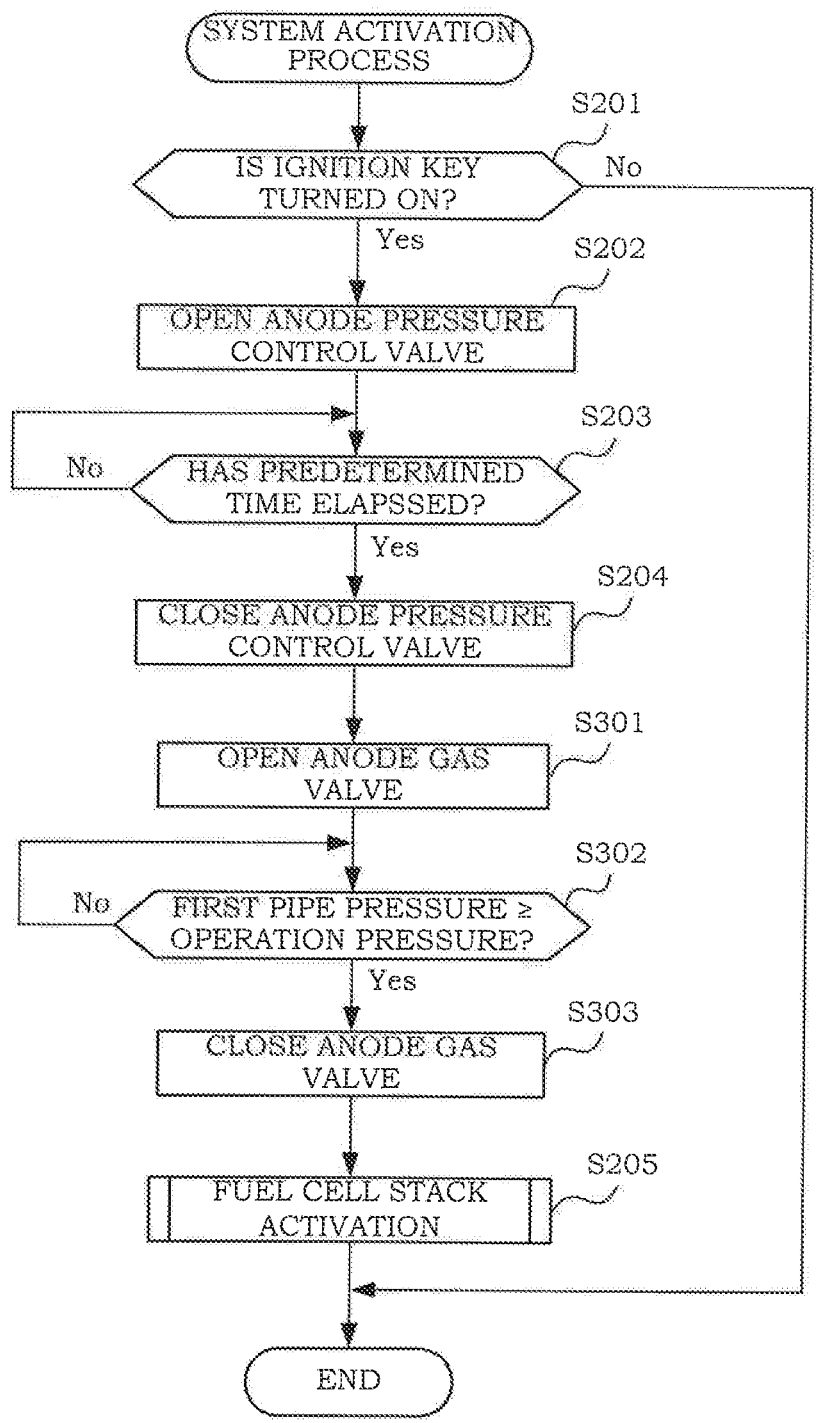
FIG. 16 is a flowchart illustrating a system activating process executed by a controller in the second embodiment.

FIG. 16 is a flowchart illustrating the system activation process executed by the controller 10 according to the embodiment. Steps similar to those in the flowchart in FIG. 6 have identical step numbers attached.

In the system activation process, the controller 10, first, determines whether the ignition key is turned ON by the user of the vehicle or not (Step S201). When it is determined that the ignition key is not turned ON, the controller 10 terminates this system activation process.

On the other hand, when it is determined that the ignition key is turned ON, the controller 10 opens the anode pressure control valve 36 (Step S202). Then, the controller 10 measures the time from the anode pressure control valve 36 is opened to determine whether the predetermined time has elapsed or not (Step S203). The controller 10 stands by at Step S203 until the predetermined time elapses.

When it is determined that the predetermined time has elapsed, the controller 10 closes the anode pressure control valve 36 (Step S204), and after the anode pressure control valve 36 is fully closed, the anode gas valve 35 is opened (Step S301). Then, the controller 10 monitors the first pipe pressure $P_1$, which is the pressure inside the first pipe 32.

Next, the controller 10 determines whether the first pipe pressure $P_1$ is equal to or more than the predetermined operation pressure or not (Step S302). The controller 10 stands by at Step S302 until the first pipe pressure $P_1$ becomes equal to or more than the predetermined operation pressure.

Then, when it is determined that the first pipe pressure $P_1$ is equal to or more than the predetermined operation pressure, the controller 10 closes the anode gas valve 35 (Step S303), executes the activation sequence to activate the fuel cell stack 1 (Step S205), and then terminates this system activation process. It should be noted that the activation sequence of the fuel cell stack 1 is simply performed by a known method corresponding to a system configuration of the fuel cell system 100; therefore, the detailed explanation will not be elaborated here.

As described above, the fuel cell system 100 according to the embodiment is configured such that the controller 10 opens the anode pressure control valve 36 at the activation of the fuel cell system 100, closes the valve after the predetermined time elapses, and then opens the anode gas valve 35 so as to set the first pipe pressure $P_1$ to the predetermined operation pressure and closes the anode gas valve 35 and then executes the activation of the fuel cell stack 1. In addition to the effect in the above-described first embodiment, this ensures obtaining the pressure control accuracy of the anode pressure control valve 36 by boosting the first pipe pressure $P_1$ to the medium pressure.

It should be noted that activating the fuel cell stack 1 while the anode gas pressure inside the first pipe 32 is still low causes the boost speed at the activation to slow down, thereby possibly affecting the feedback control of the anode gas pressure. Therefore, in the embodiment, the first pipe pressure $P_1$ is promptly boosted to the medium pressure after the warm up of the anode pressure control valve 36.

Third Embodiment

The following describes a third embodiment of the present invention focusing mainly on differences with the second embodiment. It should be noted that the overall configuration of the fuel cell system 100 is similar; therefore, an operation of the fuel cell system 100 according to the embodiment will be described using FIG. 1 and FIG. 2. In the embodiment, for parts that provide functions similar to those in the first embodiment and the second embodiment described above, identical reference numerals are used to appropriately omit duplicate explanations.

In the above-described second embodiment, as soon as the ignition key is confirmed to be turned ON, the anode pressure control valve 36 is warmed up by opening and closing the anode pressure control valve 36 before the activation of the fuel cell stack 1. In this embodiment, it is configured to determine whether the warm up of the anode pressure control valve 36 is performed or not by confirming the first pipe pressure $P_1$.

A description will be given of the operation of the fuel cell system 100 according to the embodiment. It should be noted that the system stop process is similar to the flowchart in FIG. 5; therefore, only the system activation process will be described.

Figure 17:
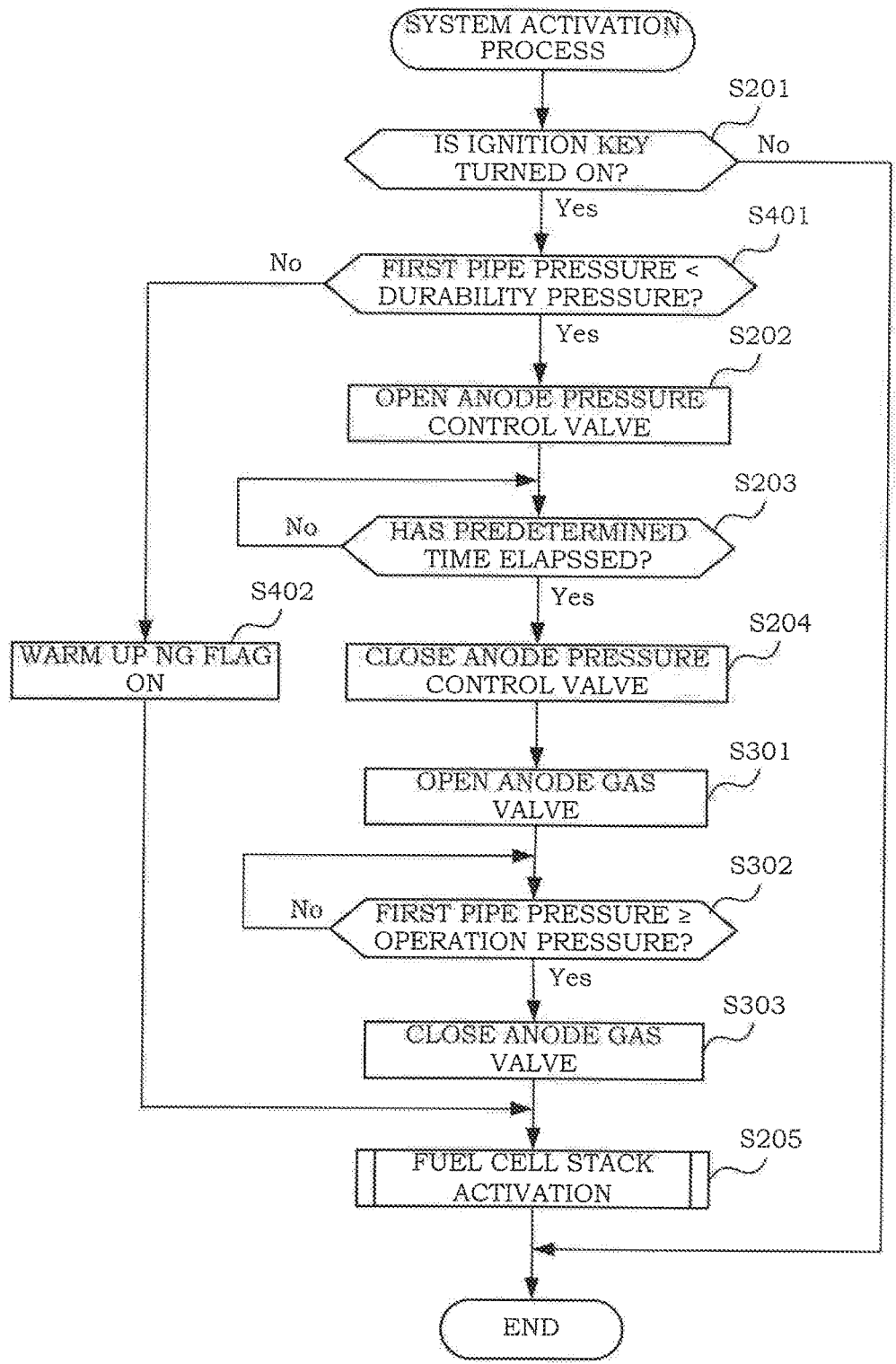
FIG. 17 is a flowchart illustrating a system activating process executed by a controller in a third embodiment.

FIG. 17 is a flowchart illustrating a system activation process executed by the controller 10 in the third embodiment. Steps similar to those in the flowcharts in FIG. 6 and FIG. 16 have identical step numbers attached.

In the system activation process, the controller 10, first, determines whether the ignition key is turned ON by the user of the vehicle or not (Step S201). When it is determined that the ignition key is not turned ON, the controller 10 terminates this system activation process.

On the other hand, when it is determined that the ignition key is turned ON, the controller 10 determines whether the first pipe pressure $P_1$ is less than the durability pressure or not on the basis of a detected value of the first pipe pressure sensor 38 (Step S401). When the first pipe pressure $P_1$ is not less than the durability pressure, that is, when the first pipe pressure $P_1$ is equal to or more than the durability pressure, it is possible to degrade the durability of the fuel cell stack 1 when the anode pressure control valve 36 is warmed up as it is. Therefore, when it is determined that the first pipe pressure $P_1$ is not less than the durability pressure, the controller 10 turns a warm up NG flag ON (Step S402), executes the fuel cell stack activation process (Step S205), and then terminates this system activation process.

It should be noted that, while the illustration is omitted similarly to the above-described first and second embodiments, when the warm up NG flag is set to ON, in the fuel cell stack activation process, the controller 10 is only necessary to set a target pressure smaller than a target pressure at the activation based on the pressure in the anode gas flow passage inside the fuel cell stack 1 detected by the pressure sensor 39 and open the anode pressure control valve 36 corresponding to the setting value. This cannot perform the warm up of the anode pressure control valve 36, however, ensures preventing the durability of the fuel cell stack 1 from being degraded.

On the other hand, when it is determined that the first pipe pressure $P_1$ is less than the durability pressure, the controller 10 opens the anode pressure control valve 36 (Step S202). Then, the controller 10 measures the time from when the anode pressure control valve 36 is opened to determine whether the predetermined time has elapsed or not (Step S203). The controller 10 stands by at Step S203 until the predetermined time elapses.

When it is determined that the predetermined time has elapsed, the controller 10 closes the anode pressure control valve 36 (Step S204), and after the anode pressure control valve 36 is fully closed, opens the anode gas valve 35 (Step S301). Then, the controller 10 monitors the first pipe pressure $P_1$, which is the pressure inside the first pipe 32.

Next, the controller 10 determines whether the first pipe pressure $P_1$ has become equal to or more than the predetermined operation pressure or not (Step S302). The controller 10 stands by at Step S302 until the first pipe pressure $P_1$ becomes equal to or more than the predetermined operation pressure.

Then, when it is determined that the first pipe pressure $P_1$ becomes equal to or more than the predetermined operation pressure, the controller 10 closes the anode gas valve 35 (Step S303), executes the activation sequence to activate the fuel cell stack 1 (Step S205), and terminates this system activation process. It should be noted that the activation sequence for the fuel cell stack 1 is simply performed by a known method corresponding to a system configuration of the fuel cell system 100; therefore, the detailed explanation will not be elaborated here.

As described above, the fuel cell system 100 according to the embodiment is configured so as not to open the anode pressure control valve 36, that is, not to warm up the anode pressure control valve 36 at the activation of the fuel cell system 100 when the first pipe pressure $P_1$ before activating the fuel cell system 100 is equal to or more than the durability pressure. In particular, when the first pipe pressure $P_1$ is equal to or more than the predetermined pressure, such as when the fuel cell system 100 is stopped due to Fail and the like, it is possible to damage, for example, each electrode and electrolyte membrane inside the fuel cell stack 1. Opening the anode pressure control valve 36 possibly cause the boundary surface (the hydrogen front) between the anode gas and the remained gas inside the fuel cell stack 1. In the embodiment, thus configuring the fuel cell system 100 ensures effectively preventing these failures from occurring.

Fourth Embodiment

Figure 18:
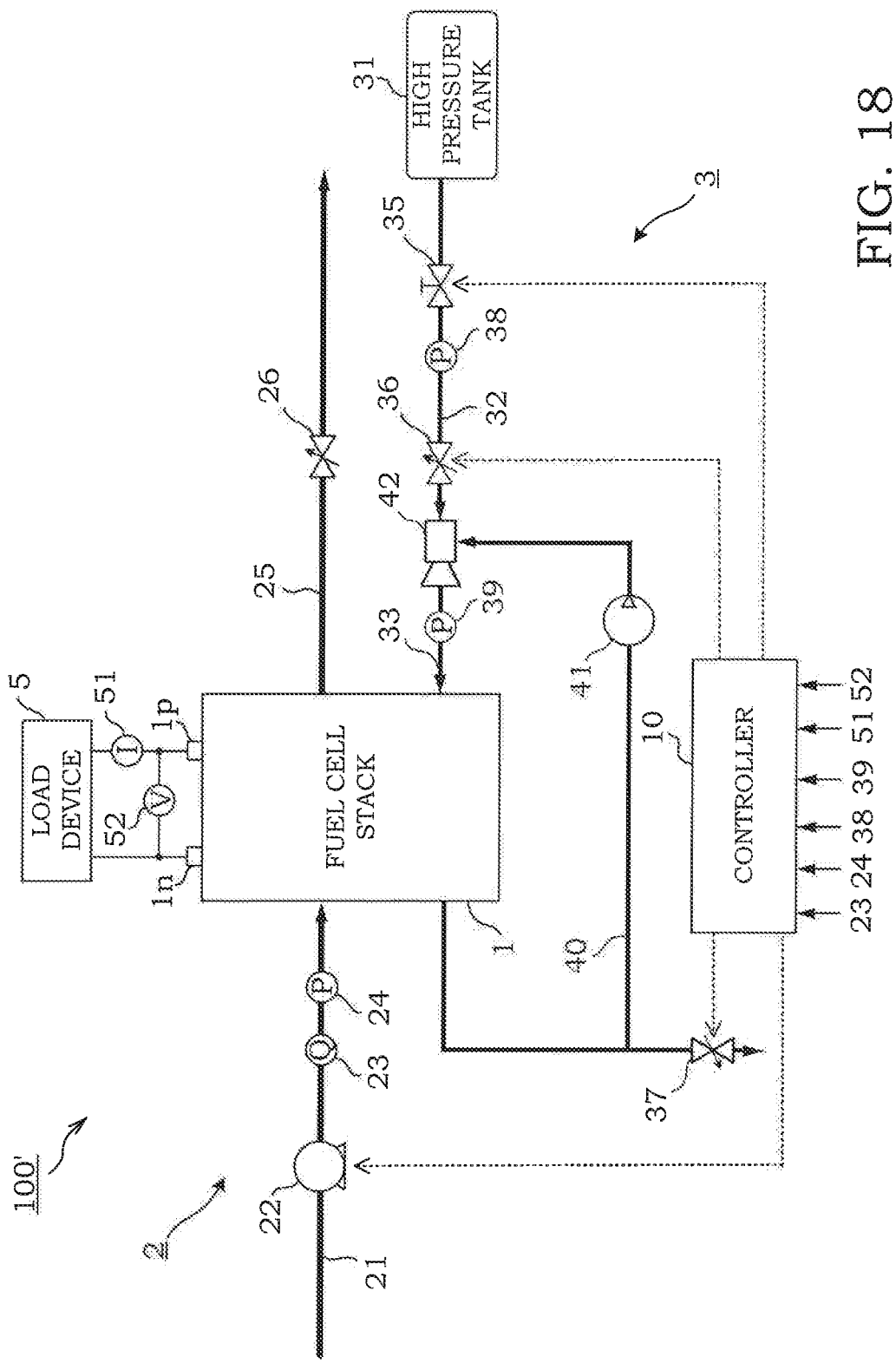
FIG. 18 is a drawing illustrating an overall configuration of a fuel cell system in a fourth embodiment.

The following describes a fourth embodiment of the present invention focusing mainly on differences with the first embodiment. In the embodiment, the overall configuration of the fuel cell system 100 is different; therefore, a configuration of a fuel cell system 100' will be described using FIG. 18. FIG. 18 is a drawing illustrating an overall configuration of the fuel cell system 100' in the fourth embodiment. In the embodiment, for parts that provide functions similar to those in the above-described first embodiment, identical reference numerals are used to appropriately omit duplicate explanations.

In the above-described first embodiment to third embodiment, the control methods of the present invention have been executed in the fuel cell system of the anode gas non-circulation type. In this embodiment, these control methods are executed in a fuel cell system of an anode gas circulation type.

FIG. 18 is a drawing illustrating the overall configuration of the fuel cell system 100' in the fourth embodiment. As illustrated in FIG. 18, the fuel cell system 100' according to the embodiment is the fuel cell system of the anode gas circulation type.

The anode gas supplying/discharging device 3 is a device that supplies the anode gas to the fuel cell stack 1 and circulate the anode off-gas discharged from the fuel cell stack 1 into the fuel cell stack 1.

The anode gas supplying/discharging device 3 includes the high pressure tank 31, the first pipe 32 and the second pipe 33 on the anode gas supply passage, an anode gas circulation passage 40, the anode gas valve 35, the anode pressure control valve 36, the purge valve 37, an ejector 42, and an anode circulation pump 41. It should be noted that, while the illustration is omitted, on the anode gas circulation passage 40, a gas-liquid separation device to separate the anode off-gas inside the anode gas circulation passage 40 and the water (a liquid water) generated by a water vapor generated by the electrode reaction condensing.

The anode gas circulation passage 40 is a passage that circulates the anode off-gas discharged from the fuel cell stack 1 into the anode gas supply passage. The anode gas circulation passage 40 has one end coupled to the anode gas outlet hole of the fuel cell stack 1 and the other end coupled to a suction port of the ejector 42.

The ejector 42 is disposed between the anode pressure control valve 36 and the fuel cell stack 1 on the anode gas supply passage. The ejector 42 is a mechanical pump disposed at a portion where the anode gas circulation passage 40 joins to the anode gas supply passage. Disposing the ejector 42 on the anode gas supply passage ensures circulating the anode off-gas into the fuel cell stack 1 with a simple constitution.

The ejector 42 suctions the anode off-gas from the fuel cell stack 1 by accelerating a flow rate of the anode gas supplied from the anode pressure control valve 36 to generate a negative pressure. The ejector 42 discharges the suctioned anode off-gas into the fuel cell stack 1 together with the anode gas supplied from the anode pressure control valve 36.

The ejector 42 is constituted of, for example, a conical shaped nozzle having an opening narrowed toward the fuel cell stack 1 from the anode pressure control valve 36 and a diffuser including a suction port suctioning the anode off-gas from the fuel cell stack 1. It should be noted that, while in this embodiment, the ejector 42 is used as joining means of the anode gas supply passage and the anode gas circulation passage 40, the anode gas supply passage may simply be joined by the anode gas circulation passage 40.

The anode circulation pump 41 is disposed on the anode gas circulation passage 40. The anode circulation pump 41 circulates the anode off-gas into the fuel cell stack 1 via the ejector 42. A rotation speed of the anode circulation pump 41 is controlled by the controller 10. This adjusts the flow rate of the anode off-gas circulated in the fuel cell stack 1.

In the embodiment, the predetermined pressure is simply determined so as to be in the region A in the diagonal lines in the graph as illustrated in FIG. 13 on the basis of the volume ratio of the volume of the second pipe system, which is the combination of the second pipe 33 and the anode gas circulation passage 40, to the volume inside the first pipe 32. It should be noted that while it is possible to set the predetermined pressure to be in the region B, it is presumed that the anode gas flows into a side of the anode gas circulation passage 40 via the ejector 42 when the anode pressure control valve 36 is warmed up. Therefore, it is only necessary to confirm its behavior by, for example, an experiment, and then set to be in the region B.

It should be noted that, in the embodiment, since the volume of the second pipe system becomes relatively large, it is possible to use the anode gas circulation passage 40. That is, the boundary surface (the hydrogen front) between the anode gas and the remained gas may be eliminated by actively mixing the remained gas and the anode gas by activating the anode circulation pump 41 simultaneously with opening of the anode pressure control valve 36 for the warm up. This ensures effectively preventing the boundary surface from being generated inside the fuel cell stack 1 and preventing the damage to, for example, each electrode and electrolyte membrane inside the fuel cell stack 1.

Also in the fuel cell system 100' in the embodiment, executing the system stop process and the system activation process in the above-described first embodiment to third embodiment ensures providing an effect similar to the above-described embodiments.

The embodiments of the present invention described above are merely illustrations of a part of application example of the present invention and not of the nature to limit the technical scope of the present invention to the specific constructions of the above embodiment. A part of the first embodiment may be omitted, and the above-described embodiments can be combined as necessary.

The invention claimed is:

1. A fuel cell system that supplies an anode gas and a cathode gas to a fuel cell to cause the fuel cell to generate an electricity, the fuel cell system comprising:
   a high pressure tank that stores the anode gas in a high pressure, the anode gas being supplied to the fuel cell;
   an anode gas supply passage configured to supply the anode gas to the fuel cell from the high pressure tank;
   an anode pressure control valve disposed on the anode gas supply passage, the anode pressure control valve adjusting an anode gas pressure of the fuel cell;
   an anode gas valve disposed between the high pressure tank and the anode pressure control valve, the anode gas valve adjusting a source pressure of the anode pressure control valve; and
   a controller programmed to control to open and close the anode pressure control valve and the anode gas valve on the basis of an operating state of the fuel cell system, wherein
   the controller is programmed to control the anode pressure control valve and then close the anode pressure control valve after the controller closes the anode gas valve such that a first pipe pressure becomes less than a predetermined pressure before the fuel cell system is stopped, the first pipe pressure being a pressure inside a first pipe between the anode gas valve and the anode pressure control valve in the anode gas supply passage,
   the controller is programmed to open the anode pressure control valve at an activation of the fuel cell system, and
   the predetermined pressure is smaller than a pressure that degrades a durability of the fuel cell at the activation of the fuel cell system.

2. The fuel cell system according to claim 1, wherein the predetermined pressure is a pressure with which a boundary surface between the anode gas inside the first pipe and a gas inside a second pipe between the anode pressure control valve and the fuel cell is outside with respect to the fuel cell when the anode pressure control valve is opened at the activation of the fuel cell system.

3. The fuel cell system according to claim 1, wherein the predetermined pressure is equal to or more than a pressure necessary at the activation of the fuel cell system.

4. The fuel cell system according to claim 1, wherein at the activation of the fuel cell system, a current command value supplied to the anode pressure control valve is a command value as a current within a guaranteed range of the anode pressure control valve even in a condition where an electrical resistance becomes a minimum in a usage condition where the anode pressure control valve is used.

5. The fuel cell system according to claim 1, wherein the controller is programmed to supply a current to the anode pressure control valve at the activation of the fuel cell system and terminate supplying the current when a predetermined time elapses.

6. The fuel cell system according to claim 1, wherein the controller is pro rammed to open the anode pressure control valve at the activation of the fuel cell system, close the valve after a predetermined time elapses, and then open the anode gas valve so as to set the first pipe pressure to a predetermined operation pressure, and close the anode gas valve and then execute an activation of the fuel cell.

7. The fuel cell system according to claim 1, wherein when the first pipe pressure before activating the fuel cell system is equal to or more than the predetermined pressure, the fuel cell system does not execute opening the anode pressure control valve at the activation of the fuel cell system.

8. A control method for a fuel cell system that supplies an anode gas and a cathode gas to a fuel cell to cause the fuel cell to generate an electricity, the fuel cell system comprising:
   a high pressure tank that stores the anode gas in a high pressure, the anode gas being supplied to the fuel cell;
   an anode gas supply passage configured to supply the anode gas to the fuel cell from the high pressure tank;
   an anode pressure control valve disposed on the anode gas supply passage, the anode pressure control valve adjusting an anode gas pressure of the fuel cell; and
   an anode gas valve disposed between the high pressure tank and the anode pressure control valve, the anode gas valve adjusting a source pressure of the anode pressure control valve, wherein
   the control method comprises:
   closing the anode pressure control valve after adjusting a first pipe pressure to a predetermined pressure by the anode pressure control valve after the anode gas valve is closed before the fuel cell system is stopped, the first pipe pressure being a pressure inside a first pipe between the anode gas valve and the anode pressure control valve in the anode gas supply passage, and opening and then closing the anode pressure control valve at an activation of the fuel cell system, wherein the predetermined pressure is smaller than a durability pressure that reduces a degradation of a durability of the fuel cell at the activation of the fuel cell system.

* * * * *